US007533406B2

(12) United States Patent
Ludvig et al.

(10) Patent No.: US 7,533,406 B2
(45) Date of Patent: May 12, 2009

(54) SYSTEMS AND METHODS FOR GENERATING A WALLED GARDEN PROGRAM FOR SUBSTANTIALLY OPTIMIZED BANDWIDTH DELIVERY

(75) Inventors: Edward A. Ludvig, Redwood City, CA (US); Jay D. Logue, San Jose, CA (US); Daniel J. Zigmond, Menlo Park, CA (US); Steven R. Sandke, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 1291 days.

(21) Appl. No.: 10/262,030

(22) Filed: Sep. 30, 2002

(65) Prior Publication Data

US 2004/0064836 A1 Apr. 1, 2004

(51) Int. Cl.
*H04N 7/173* (2006.01)
(52) U.S. Cl. .................. 725/110; 725/114; 725/138
(58) Field of Classification Search ............ 375/240.08, 375/240.25–240.27; 725/95, 113, 91, 110, 725/114, 138; 715/730–732
See application file for complete search history.

(56) References Cited

U.S. PATENT DOCUMENTS

| 5,982,445 | A  | * | 11/1999 | Eyer et al. .................. 348/461 |
| 6,188,428 | B1 |   | 2/2001  | Koz et al. |
| 6,215,483 | B1 |   | 4/2001  | Zigmond |
| 6,275,989 | B1 |   | 8/2001  | Broadwin et al. |
| 6,311,197 | B2 |   | 10/2001 | Mighdoll et al. |
| 6,317,885 | B1 |   | 11/2001 | Fries |
| 6,338,094 | B1 |   | 1/2002  | Scott et al. |
| 6,392,664 | B1 |   | 5/2002  | White et al. |
| 6,502,243 | B1 |   | 12/2002 | Thomas |
| 6,944,228 | B1 |   | 9/2005  | Dakss et al. |
| 7,111,316 | B1 | * | 9/2006  | Zahorjan et al. .............. 725/97 |
| 7,143,347 | B2 |   | 11/2006 | Su |
| 7,143,433 | B1 | * | 11/2006 | Duan et al. ................. 725/115 |
| 7,240,358 | B2 | * | 7/2007  | Horn et al. .................... 725/87 |
| 2001/0018695 | A1 |   | 8/2001  | Sequeira |
| 2002/0026642 | A1 | * | 2/2002  | Augenbraun et al. ........ 725/109 |
| 2002/0026645 | A1 | * | 2/2002  | Son et al. .................... 725/117 |
| 2002/0035728 | A1 |   | 3/2002  | Fries |

(Continued)

FOREIGN PATENT DOCUMENTS

EP  0 837 599 A2  4/1998

(Continued)

*Primary Examiner*—John W Miller
*Assistant Examiner*—Chris Parry
(74) *Attorney, Agent, or Firm*—Lee & Hayes, PLLC

(57) ABSTRACT

Systems and methods for generating a walled garden program for substantially optimized bandwidth delivery are described. In particular, layers of data that are substantially similar across multiple pages of Web content are identified for subsequent reuse during transcoding operations. To this end, the content pages are transcoded into a program that includes multiple video components. The pages are transcoded such that a layer that was determined to be substantially similar across multiple ones of the pages is not encoded into a respective video component for each substantially similar occurrence of the layer. Rather, the layer and all other substantially similar layers are represented in the program with a single still of the video components and interaction model metadata. By reusing similar components, the amount of data used to represent the Web content is reduced, providing for substantially optimized bandwidth delivery to the client.

30 Claims, 12 Drawing Sheets

U.S. PATENT DOCUMENTS

| | | |
|---|---|---|
| 2002/0059644 A1 | 5/2002 | Andrade |
| 2002/0083469 A1* | 6/2002 | Jeannin et al. .............. 725/135 |
| 2002/0138831 A1 | 9/2002 | Wachtfogel et al. |
| 2003/0070170 A1 | 4/2003 | Lennon |
| 2003/0084440 A1 | 5/2003 | Lownes |
| 2003/0172381 A1 | 9/2003 | Janevski |
| 2003/0233451 A1 | 12/2003 | Ludvig et al. |
| 2004/0205596 A1 | 10/2004 | Sequeira |
| 2005/0026645 A1 | 2/2005 | Yamamoto |
| 2007/0065109 A1* | 3/2007 | Kim et al. .................... 386/95 |

FOREIGN PATENT DOCUMENTS

| | | |
|---|---|---|
| WO | WO 01/63806 A2 | 8/2001 |
| WO | WO 01/78390 A1 | 10/2001 |

* cited by examiner

EXEMPLARY iMPEG BACKGROUND IMAGE PRESENTED ON VIDEO PLANE 300

IMAGES OF LEFT AND RIGHT BUTTON CONTROLS 302 304

EXEMPLARY METADATA PRESENTED ON OSD 400

402

OUTLINE OF CURSOR OVER DEFAULT BUTTON THAT HAS FOCUS

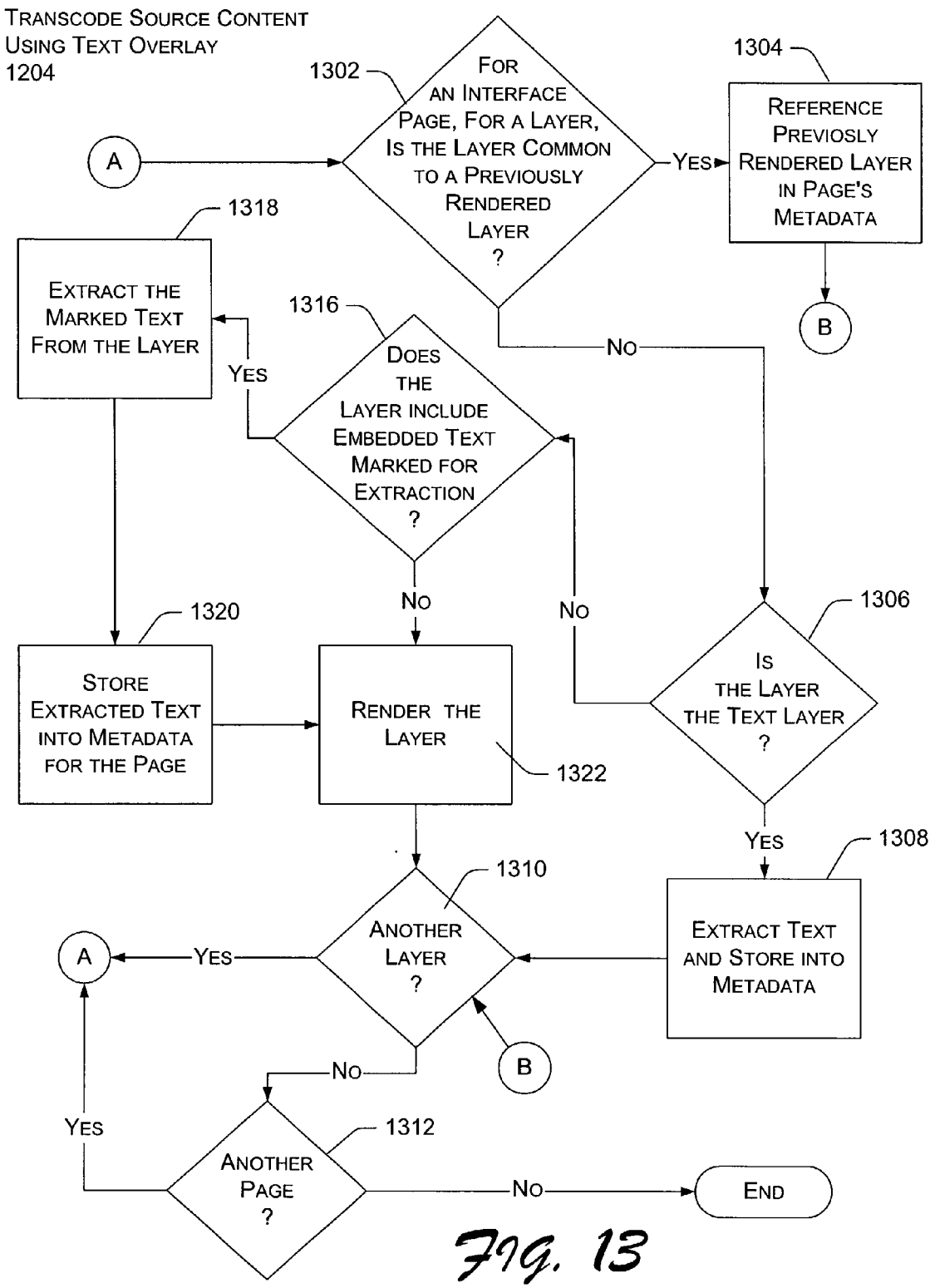

SYSTEMS AND METHODS FOR GENERATING A WALLED GARDEN PROGRAM FOR SUBSTANTIALLY OPTIMIZED BANDWIDTH DELIVERY

RELATED APPLICATIONS

This patent application is related to the following copending U.S. applications:

U.S. application Ser. No. 10/154,622, titled "Systems and Methods to Reference Resources in a Television-Based Entertainment System", filed on May 22, 2002, and hereby incorporated by reference; and U.S. application Ser. No. 10/262,325, titled "Systems and Methods for Dynamic Conversion of Web Content to an Interactive Walled Garden Program", filed on Sep. 30, 2002, and hereby incorporated by reference.

TECHNICAL FIELD

The following invention relates to resource management. More particularly, the invention pertains to generating walled garden content that provides for improved utilization of bandwidth delivery to a networked client.

BACKGROUND

A number of existing techniques allow end-users to access World Wide Web (WWW) information services using a television set instead of a computer monitor. These techniques further allow WWW content providers to modify information service content (e.g., Web page content) so that it can be broadcast by a head-end to viewers. These conventional techniques are beneficial because they bridge a gap between WWW information services and broadcast interactive television (ITV) content in a manner that is user scalable. However, these conventional techniques are also limited for a number of reasons.

For instance, existing techniques to broadcast originally Web-based content typically require WWW content providers to engage in substantial efforts to convert the Web content into a data format that is compatible with one or more particular cable broadcast servers, clients, and/or transport implementations. This means that the WWW content providers must not only design Web content for proper display within constraints of various implementations of television appliances, but must also utilize various tools and pre-existing knowledge to generate content that may be compatible with a particular head-end's specific server and/or transport implementations so that a respective head-end can broadcast the content to viewers. Such design and transformation activities are generally labor intensive and time consuming. Note, these design and transformation activities must be performed by the WWW content provider prior to transferring any information (i.e., Web content that has been converted by WWW content providers into a different data format for broadcast to subscribers) to a head-end.

To make matters worse, today's consumers generally demand rapid access to content, regardless of whether the content was originally deployed by a Web-server or on some other server (e.g., a Video-On-Demand (VOD) server). Yet conventional techniques to broadcast transformed Web data are not streamlined for rapid deployment to such information eager consumers. This is because these conventional techniques require transmission of substantially large amounts of data to the consumer. This means that such conventional techniques are generally very bandwidth intensive. Bandwidth is a commodity. The ability to rapidly deliver broadcast content to consumers is at least partially a function of communication pathway data throughput speeds, which are generally reduced by transmission of large amounts of data.

The following systems and methods address these and other limitations of conventional arrangements and techniques to create and deliver content to networked clients.

SUMMARY

Systems and methods for generating a walled garden program for substantially optimized bandwidth delivery are described. In particular, layers of data that are substantially similar across multiple pages of Web content are identified for subsequent reuse during transcoding operations. To this end, the content pages are transcoded into a program that includes multiple video components. The pages are transcoded such that a layer that was determined to be substantially similar across multiple ones of the pages is not encoded into a respective video component for each substantially similar occurrence of the layer. Rather, the layer and all other substantially similar layers are represented in the program with a single still of the video components and interaction model metadata. By reusing similar components, the amount of data used to represent the Web content is reduced, providing for substantially optimized bandwidth delivery to the client.

BRIEF DESCRIPTION OF THE DRAWINGS

The same numbers are used throughout the drawings to reference like features and components.

FIG. 13 shows further aspects of the exemplary procedure of FIG. 12 to dynamically convert downloaded Web content into data that can be presented and navigated by resource constrained clients in a digital television network. The data is dynamically generated using one or more text overlays for substantially optimized broadcast delivery to a client.

DETAILED DESCRIPTION

Overview

The Information Service (IS) architecture described below supports many types of ITV services, such as WWW walled garden applications, Electronic Program Guide (EPG) services, VOD navigator applications, and so on. A basic feature of the described IS architecture is the ability for a cable head-end to download walled garden Web source content for dynamic transcoding using layer reuse and text overlay data reduction features into an interactive walled garden program (iWGP). The resulting iWGP requires substantially less communication bandwidth for deliver to a client and further does not require a Web browser for presentation by a receiving client. The program is interactive because along a stream of MPEG still images, or image pages, the program includes corresponding metadata that provides an interaction model for a user to navigate the MPEG still images from the client.

For instance, conveyed metadata describes links (i.e., a URL) to other image page content, links to one or more applications hosted by the client, and/or focus areas to access a limited set of side effects and actions. A cable user (subscriber) can select and activate links/focus areas corresponding to an image page with an input device such as a hand-held remote control, thereby interacting with pages of information displayed by the thin client onto a display screen.

Since Web source content transcoded by the cable head-end into an iWGP can be presented and navigated by users of digital television clients, the client does not require a Web browser to view information that corresponds to the Web content. In this manner, any client processing and/or data storage resource dependencies that would otherwise be needed to view the Web content with a Web source content browser are substantially reduced.

An Exemplary Information Service

Figure 1:
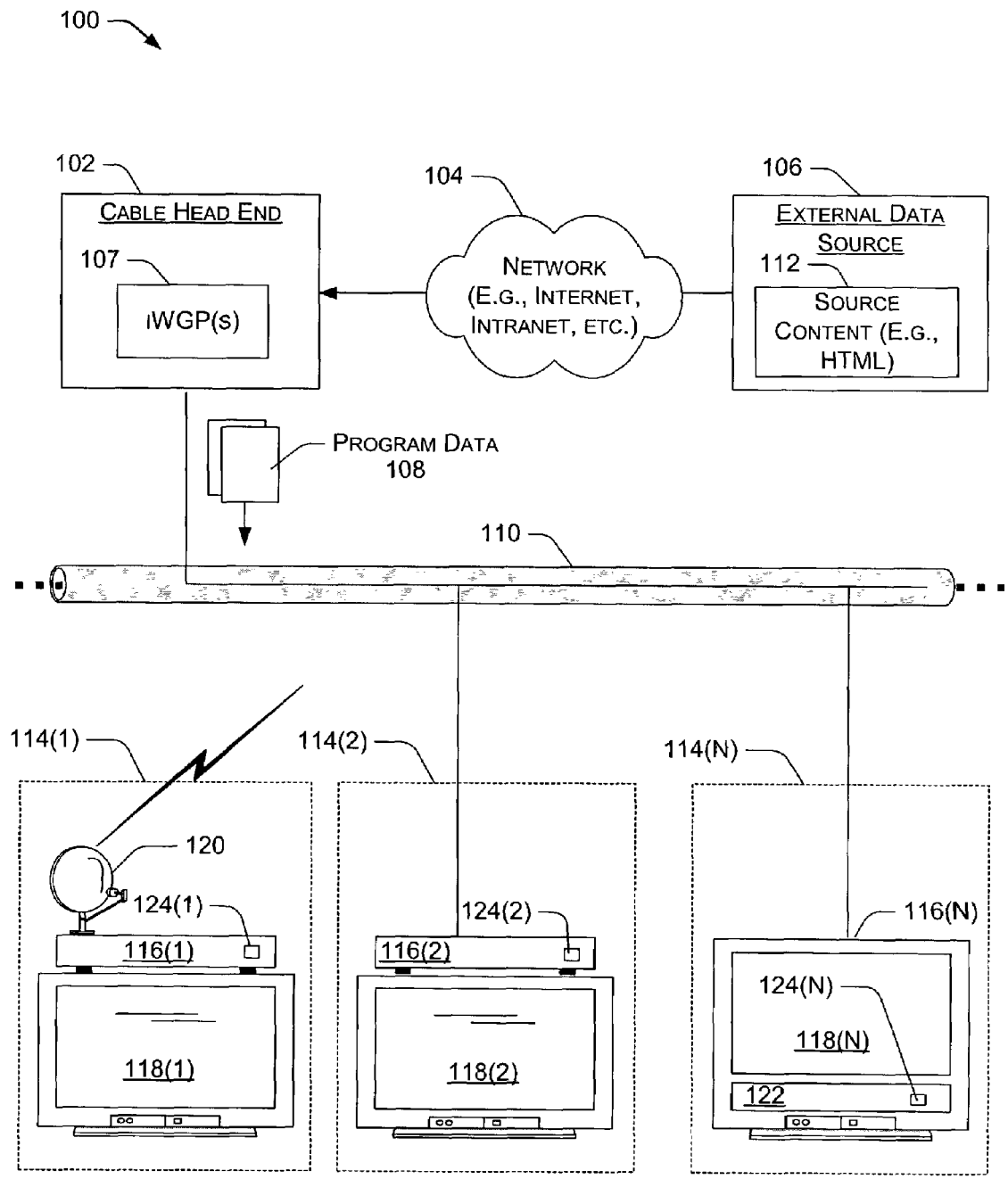
FIG. 1 shows an exemplary information service system to support many types of ITV services, such as WWW walled garden applications, Electronic Program Guide (EPG) services, VOD navigator applications, etc. A feature of the system is that a cable head-end dynamically converts downloaded Web content into broadcast-ready-data for delivery to digital television network clients.

FIG. 1 shows an exemplary information service system to convert downloaded HTML content into an iWGP that can be presented and navigated by resource constrained clients in a digital television network. As will be discussed below, the iWGP is generated in a manner that is substantially optimized for delivery to a client.

In general, head-end 102 directly interfaces with one or more external data sources 106 to fetch and receive source content 112 over network 104. External data source(s) 106 distribute the source content to facilitate ITV functionality of information service 100. To this end, external data source(s) 106 represent a Web server and any number of other types of network servers such as an EPG server, a VOD server, and so on.

Source content 112 represents walled garden Web content such as that formatted in Hypertext Markup Language (HTML). For purposes of this discussion, source content 112 further includes dynamic HTML (DHTML) content. DHTML, as is known, may include combinations of Java applets, JSCripts and JavaScript, Flash animation, marquees, META-tag refreshes, and so on.

Source content 112 is authored using standard and well known HTML creation tools, such as provided in an HTML-ready authoring program. The number of fonts and languages that may be represented by source content 112 is virtually unlimited. Head-end 102 downloads and transcodes the source content into an iWGP that conforms to represented font(s) and language(s) as a function of the particular font and/or language packs that are installed at the particular head-end 102.

Source content 112 may be authored to reference a limited or closed set of resources such as those presented via a walled garden Web site. For instance, although the walled garden may reference source content deployed by more than a single Web site (e.g., content may reference a weather service web site, a sports service web site, a news headlines web site, etc.), walled garden content does not reference resources that are outside of the walled garden. This constrains user navigation to predetermined boundaries, providing transitive closure that is in contrast to an open set of resources, wherein there is no such closure. Source content may also reference content that does not provide such transitive closure, for example, by referencing a co-hosted application on the target-set top box 116. This is accomplished via an embedded intrinsic event handler. These and other aspects of authored Source content 112 are described in greater detail below.

Head-end 102 dynamically converts downloaded source content 112 representing a single walled garden Web site into a single iWGP 107 for substantially optimized broadcast delivery as program data 108 onto coaxial cable transmission medium 110. The transmitted signals are received at one or multiple subscriber locations 114(1)-114(N). At least one of the subscriber locations, such as the location 114(1), includes a digital set-top box 116(1) or the like, equipped to convert the transmitted signals into signals capable of being received by a standard (e.g., NTSC) television set 118(1) for displaying video images and/or outputting audio to a subscriber/user.

Set-top boxes 116 can be implemented in a number of different ways. For example, set-top box 116(1) receives broadcast content from a satellite-based transmitter via satellite dish 120. Set-top box 116(1) is coupled to the television 118(1) for presenting content (e.g., audio data and video data) received by the set-top box, as well as a graphical user interface. Set-top box 116(2) is coupled to receive broadcast content from a broadcast network, represented herein as coaxial cable 110, and provide the received content to associated television 118(2). Set-top box 116(N) is an example of a combination television 118(N) and integrated set-top box 122. In this example, the various components and functionality of the set-top box are incorporated into the television, rather than using two separate devices. The set-top box incorporated into the television may receive broadcast signals via a satellite dish (similar to satellite dish 120 via coaxial cable 110, and or terrestrial digital).

Each set-top box 116 is coupled to any number of televisions 118 and/or similar devices that are implemented to display or otherwise render content. Similarly, any number of set-top boxes 116 can be coupled to a television 118.

Although system 100 represents a broadcast network with coaxial cable 110 as the physical transmission medium, the head-end 102 can alternatively broadcast signals to client devices (e.g., set-top boxes 116) over different transmission media. For instance, the head-end 102 can alternatively broadcast signals to client devices via wireless means such as so-called "wireless cable" broadcasts, digital satellite communication, etc.

An Exemplary Head-End

Figure 2:
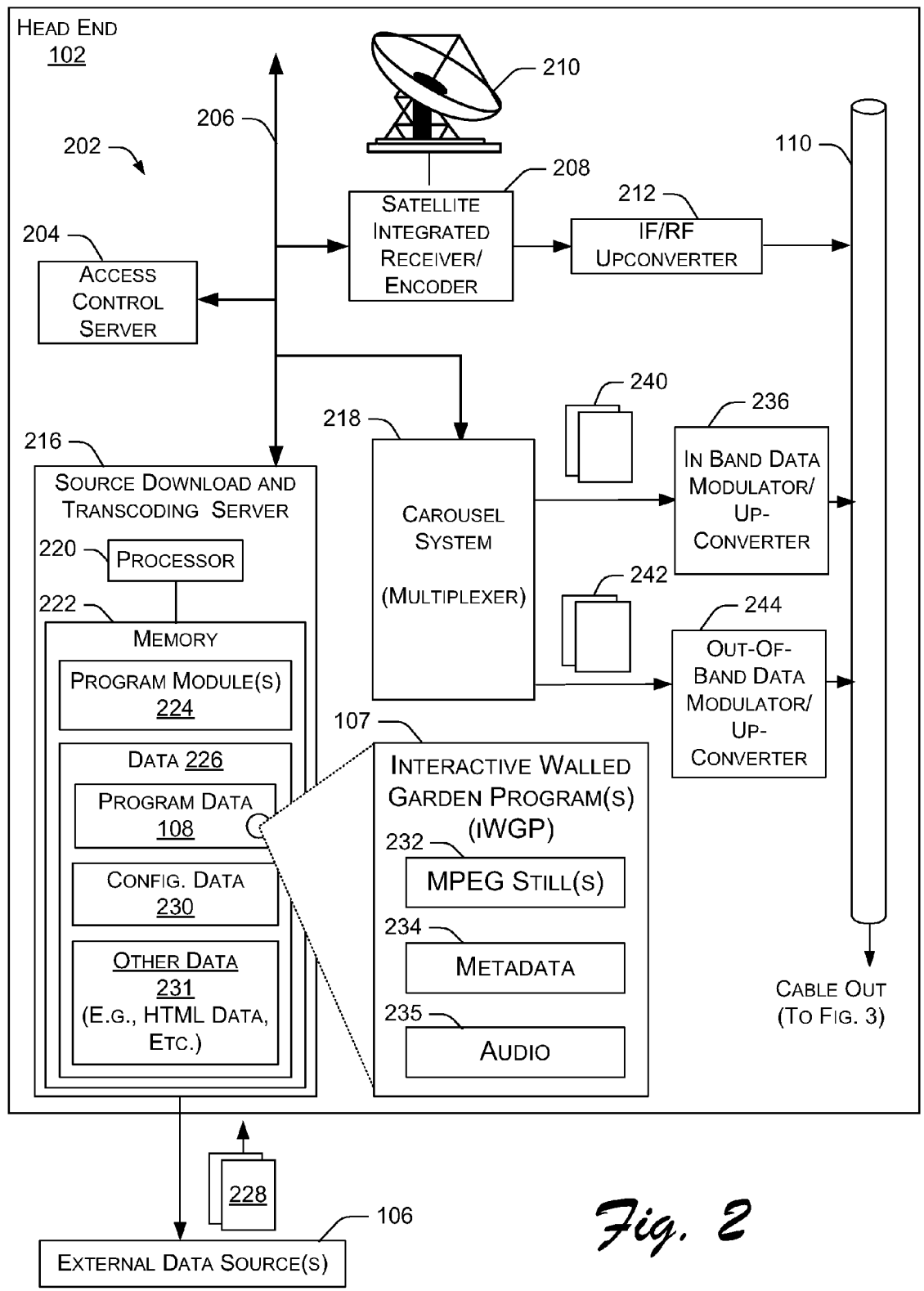
FIG. 2 shows exemplary aspects of the head-end of FIG. 1 in more detail.

As shown in more detail in FIG. 2, head-end 102 contains head-end local area network (LAN) 202, including an access control server 204 for controlling the operation of the head-end 102 over communication path 206 (e.g., an Intranet implementing Ethernet) to the various components therein.

A satellite integrated receiver/encoder 208, receives and encodes digital television programming signals such as originating from microwave broadcasts received via satellite antenna (dish) 210. One such receiver/encoder 208 outputs twenty-seven megabits per second (27 Mb/s) MPEG2 transport streams modulated onto a forty-four megahertz intermediate frequency carrier. In turn, the MPEG2-encoded transport streams are received by an intermediate frequency to radio frequency (IF/RF) up-converter 212.

The frequency up-converter 212 modulates the MPEG2-encoded transport streams onto six megahertz analog channels and injects the signals onto the broadcast network, which in this implementation is illustrated as cable transmission medium 110. By multiplexing multiple, packetized digital signals per six megahertz analog channel, hundreds of digital channels may be injected onto a single coaxial medium.

The Source Download/Transcode Server

In addition to broadcasting conventional television programming, head-end 102, and more particularly the source download/transcode server 216, downloads and dynamically converts source content 112 representing a walled garden into an iWPG for substantially optimized bandwidth utilization during delivery to set-top box(es) 116. Server 216 downloads source content 112 (FIG. 1) from one or more external data sources 106. The server may rely on Internet, intranet, and/or Virtual Private Network (VPN) access (e.g., via a local provider) from within the headend to fetch and receive the source content. (Hereinafter, the source download/transcode server 216 is often referred to as the "server", "download server", "transcode server", "iWPG Server", and so on, each name being representative of the particular functionality that is being discussed at the time.)

The process of converting downloaded source content 112 into an iWPG 107 is called transcoding. Because transcoding is performed at the head-end 102, source content author(s) do not need pre-existing knowledge of the data transport infrastructures of a head-end or the target clients 116. This is substantially beneficial because a source content author can create a single instance of source content for distribution to any number of different head-ends and clients with without needing such pre-existing device implementation knowledge. This means that a single instance of authored source content 112 can be dynamically converted, by any number of head-ends 102, to iWGP 107 for delivery to any number of clients, regardless of whether the respective head-ends utilize different respective server, client, and/or digital signal transport infrastructures.

The download server/transcoder component 216 is coupled across communication path 206 (e.g., Ethernet) to local head-end LAN 202. Download/transcode server 216 includes processor 220 coupled to memory 222. The memory includes volatile (i.e., random access memory (RAM)) and/or non-volatile memory. The memory comprises one or more program modules 224 and data 226. Processor 220 is configured to fetch and execute computer program instructions from program modules 224 (applications portion) of the memory, and further configured to fetch data from data 226 portion of the memory while executing the program modules.

Program modules 224 typically include routines, programs, objects, components, and so on, for performing particular tasks or implementing particular abstract data types. In this implementation, program modules 224 provide a mn-time environment (i.e., an operating system) and perform the following described operations to fetch source content 112 from external data source(s) 106 and dynamically generate iWGP(s) 107 from the fetched content for substantially optimized broadcast distribution to subscribers 114. In particular, source content 112 is fetched, or downloaded as one or more electronic files 228 from external data source(s) 106. For purposes of illustration, these electronic source content downloads are represented within server 216 as "other data" 231.

Manually or via a scripting file (not shown), a system or program administrator establishes and deploys infrastructure for use by program module(s) 224 to: (a) download source content 112 as one or more electronic files 228; (b) generate corresponding iWGP(s) 107 from the downloaded source content—the iWGP(s) being generated with layer reuse and/or text overlay data reducing features; and (c) deliver the generated broadcast data to subscribers 114. Configuration data 230 includes such infrastructure.

Server 216 includes configuration data 230, which specifies at least a home page or root of a resource tree via a Universal Resource Identifier (URI) indicating a name and address of source content 112. The URI may further include, for example, localization parameters such as head-end identifier/name, zip code and so on, as provided by a program administrator. Configuration data 230 may include other data such as a periodicity to indicate a frequency for the server 216 to fetch source content 112 from a particular URI, targeting information (e.g., a media service organization (MSO) name and headend name), etc.

To facilitate server 216 transcoding of fetched source content 112, the configuration data 230, for each URL identifying source content 112, further indicates at least a portion of the following:

- an iWGP name such as a textual descriptor for the program that is a substantially unique identifier.
- a program application ID, may be in the format OrgID.AppID, where the OrgID represents an organization ID assigned by Digital Video Broadcast, and the AppID represents an application ID that is assigned by the organization. The program application ID is used to populate a look-up file used by the client to identify the digital service on which the iWGP will be broadcast.
- a source capture rate, which is the refresh rate used to fetch source content 112 from the site deploying the source content.
- a program transport rate, which is the overall transport rate (bandwidth) allocated to an iWGP 107 (e.g., in units of bits/second). In one implementation, a default program transport rate is used.
- a parental control rating, which is a TV rating parental control setting (e.g., TV-Y7|TV-Y|TV-G|TV-PG|TV-14|TV-MA) that is applied by the download/transcode server 216 to an entire iWGP 107. The parental control rating overrides any settings that may be indicated by source content 112 or by a site deploying the source content.
- a program number (i.e., a service number) such as an MPEG number used to identify the digital service on which an iWGP 107 is to be broadcast. In the case of a Motorola cable system, this program number is used to populate a Virtual Channel Map used by the set-top box 116 as a look-up from a virtual channel number (VCN).
- a program broadcast frequency or EIA channel (e.g., set on up-converter(s) 236, 244). This configuration parameter indicates the frequency at which the iWGP 107 is to be broadcast by the head-end 102. In the case of a Motorola cable system; this value is used to populate the VCM on the Digital Audio Converter (DAC) as the look-up from the VCN).

An Exemplary Interactive Walled Garden Program (IWGP)

Source content 112 is downloaded or fetched by downloading and transcode server 216 as one or more electronic data files 228. The download/transcode server 216 downloads the source content from an external data source 106 identified by a URL according to one or more of the discussed parameters in the configuration data 230. The download source content is dynamically transcoded upon receipt, into iWGP(s) 107, each of which respectively represents broadcast ready content. In one implementation, such transcoding is performed by one or more Microsoft® Internet Explorer Active-X plug-in controls, thereby rendering fetched source content into an iWGP 107.

Each iWGP 107 is a navigable page tree that includes one or more MPEG stills 232, which are the visual portions of a page, a metadata component 234, and optional audio component 235. Each of these aspects is now described.

An Exemplary MPEG Still

Figure 5:
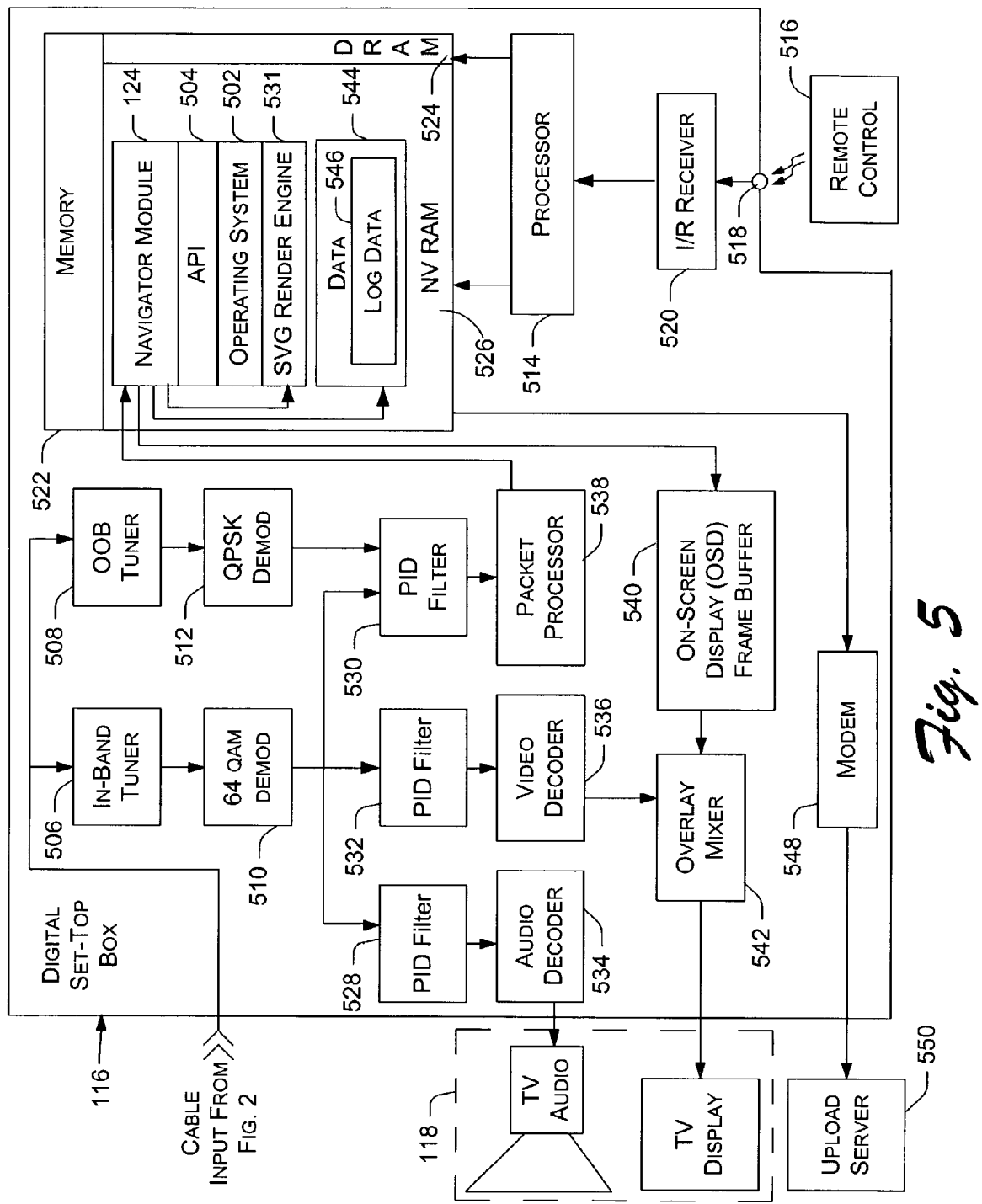
FIG. 5 shows exemplary aspects of a set-top box used at the subscriber end of the system of FIG. 1.

Each video still 232 generated by transcode server 216 is a single intra encoded MPEG2 picture (still) wrapped in a packetized elementary stream layer (PES) per the MPEG specification ISO/IEC 13818-2 Video. Each page's video component (still) 232 is assigned an exclusive Packet Identifier (PID) per the MPEG specification ISO/IEC 13818-1 Systems. Each MPEG video still 232 is capable of being decoded by an MPEG video decoder 536 in the set-top box 116 (FIG. 5).

The download/transcode server 216 generates the MPEG video 232 in compliance with US and European cable system standards using square pixel resolution parameters.

As noted above, source content 112, from which iWGP(s) 107 are generated, may be dynamic (i.e., dynamic HTML or a "DHTML" document), including any combination of Java applets, JSCripts and JavaScript, Flash animation, marquees, META-tag refreshes, and so on. Although these elements can be used, the transcode server 116 does not guarantee that the dynamic aspects of fetched source content will be finished executing, or will have executed to any specific point before the server 116 generates a snapshot of the page (i.e., a single MPEG still 232). This is because a single still image effectively freezes the current state of the source content, regardless of whether dynamic content is executing. Accordingly, to represent dynamic content such as an animation loop within a source page 112, the transcode server 216 captures a series of snapshots of the same source content page, thus preserving substantial aspects of the dynamic character of the source content.

Picture quality attributes for an MPEG still 232 are indicated with a meta-tag in corresponding metadata 234. The quality attribute impacts picture quality of a corresponding MPEG still 232 as it is displayed at the client 114. For instance, image pages may be assigned one of three levels of quality, including, high, medium, or low. These quality designations are mapped to respective minimum quantization values. The minimum quantization value indicates the degree of compression applied by the download/transcode server 216 to MPEG still 232, which is dynamically transcoded from Web content by the server 216. The degree of quanitization/compression affects the page size, which has a resultant effect on the average page size in an iWGP 107. Picture quality attributes specified by an author of source content 112 are parsed during programmatic generation of corresponding iWGP content by the server 216.

In one implementation, an exemplary image quality indications map: (a) HI quality pages to a minimum quantization of two; MED quality pages to a minimum quantization of eight; and LOW quality pages to a minimum quantization of sixteen.

There is a direct correlation between quality and the number of bits used to encode a still 232. In general, reducing a page's quality reduces its bandwidth requirement. An iWGP 107 can be edited by a system or program administrator or the transcode server 216 (i.e., programmatically) at the head-end 102 to override and/or initially assign MPEG content picture quality attributes. For example, page quality may be adjusted automatically during transcoding to accommodate any bandwidth constraints configured for the iWGP 107 (e.g., as indicated by configuration data 230). In this implementation, all pages within a source content 112 are transcoded assuming default quality unless otherwise specified by a quality attribute.

An iWGP 107 can be edited to add/remove image pages 232, corresponding metadata 234, audio 235, and so on. Related to the addition and removal of content from an iWGP 107 is the concept of MPEG still 232 priority. A page image's priority attribute affects acquisition latency of the page image at the client 114. To reduce acquisition latency, multiple instances of a frequently accessed page can be added by the program administrator (i.e., manually or automatically via configuration data 230) to the transport carousel file system 218 at spaced-apart locations. Such page image redundancy reduces the latency for that page by increasing its frequency on the carousel. The priority assigned to a particular still 232 determines the frequency with which the page appears in the carousel 218. The carousel frequency divides the latency for that page.

At scheduled intervals, the download server 216 may iteratively download source content 112 from a particular external data source 106 to synchronize or refresh a corresponding iWGP 107 so that it reflects current or updated content for subsequent broadcast publication. It is possible for the page image to be updated at a frequency equal to the maximum initial latency of the carousel 218.

iWGP Metadata

Metadata 234 describes structure of a tree (i.e., links between iWGP pages) and contents of a corresponding MPEG still 232, or page image as well as an interaction model for the page image. The transcode server 216 determines the structure of downloaded source content 112 from the HTML Document Object Model (DOM), which is indicated by the downloaded source content 112. In particular, the server 216 transcodes the structure of an HTML document by extracting the location and shape of hot-spots by searching a page's DOM for anchor tags and client-side image maps. This hot-spot or interaction model information is stored into the metadata 234 for the document.

The interaction model defined by metadata 234 provides for viewer interface with the digital set-top box 116 to selectively display the various page images 232 on the screen of the television set 118, access applications hosted by the set-top box 116, and so on. For example, a page image typically includes one or more selectable regions (hot-spots, buttons, etc.), a cursor that a viewer can move to focus on a particular region and select it (e.g., using an input device such as a remote control), and a set of responses mapped to the selectable regions. One or more of the mapped responses are triggered as a result of viewer selection of one of the selectable regions.

Figure 3:
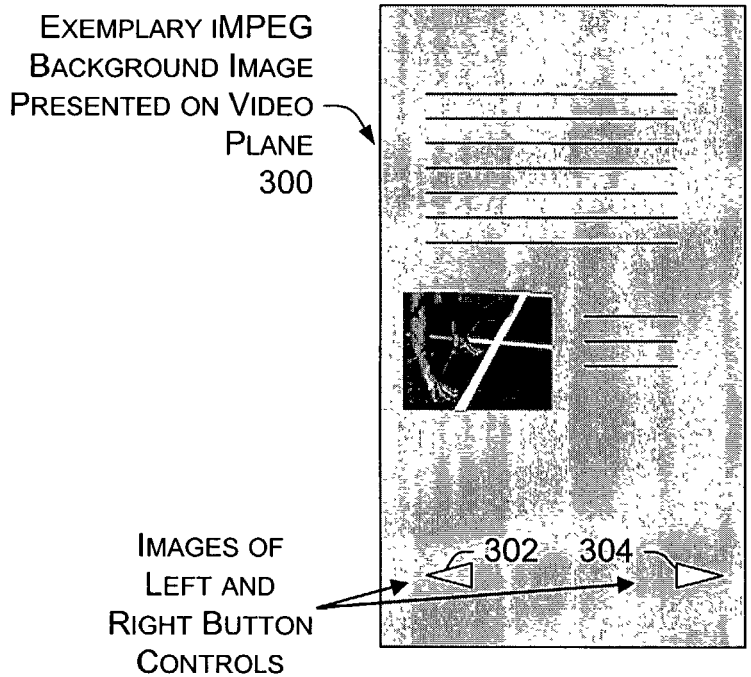
FIG. 3 shows an exemplary background image as it would appear when displayed by a client.

FIG. 3 shows an exemplary background image 300 as it would appear when displayed by a hardware video decoder on a set-top box 116. The background image 300 represents an MPEG still 232 to illustrate, among other things, two button controls 302 and 304. The metadata 234, or interface model of this example, identifies locations of hotspots on the page, identifies navigation links to other pages, and indicates response(s) to user inputs (e.g., highlighting underlying portions of the video plane) based on cursor position.

Figure 4:
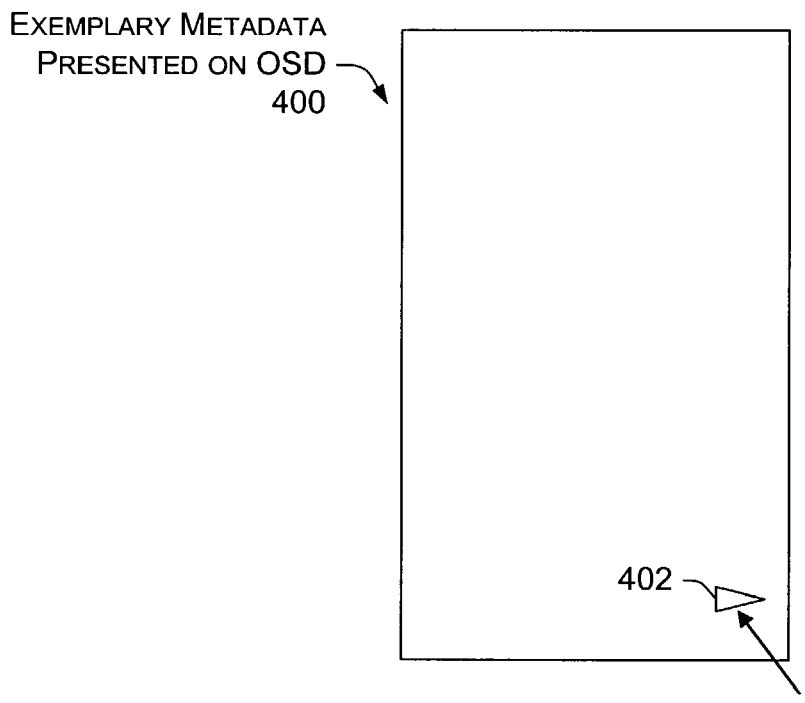
FIG. 4 shows an exemplary interaction model defined by metadata presented on an on-screen display (OSD) frame buffer of a set-top box.

FIG. 4 shows an exemplary interaction model 400 defined by metadata presented on an on-screen display frame buffer (OSD) of a set-top box 116. The OSD is capable of superimposing alphanumeric characters, other symbols and bitmap graphics over a displayed image.

In this example, the interaction model 400 of FIG. 4 displays an outline of a cursor 402 over the default hotspot (e.g., button) of the background image 300 of FIG. 3 that is has current focus. In this example, the default hotspot represents right button control 304. Through the interaction model, the set-top box 116 interface may respond to a button select action by invoking (linking) another interface page, by tuning the set-top to a specific broadcast feed, launch another application and relinquish set-top resources in the process (e.g., a button select may initiate a VOD session), and so on.

As discussed above, metadata 234 that define how focus should be drawn on links and form elements are inferred by the transcode server 216 from the source content 112 layout. Focus geometry is specified in a grid that corresponds to the source content capture resolution. In other words, even pixel addresses are used in focus specifications. The focus descriptors for each page element are combined with the other metadata for each page element.

Metadata 234 that indicate the name of the HTML source pages 112 associated with each link are inferred from the HTML source 112. The metadata defining the focus geometry and link URLs are encoded using standard client-side image map tags, e.g., <AREA>. The HREF attribute for entries relating to a form element focus will contain the URL specified by an ACTION attribute in the <FORM>tag. Appended to that URL is the form query string fragment defined by that form element. The HREF attribute for hyperlinks contain the URL from the corresponding anchor or image map.

Hypertext links, specified by walled garden source content 112, are transcoded by server 216 to relative links stored in an iWGP's corresponding metadata documents 234. In one implementation, a relative link in one metadata document may specify an absolute path to another metadata document of the same iWGP program. In another implementation, the relative link in a particular iWGP metadata document may also reference a different iWGP, the relative link indicating a digital service corresponding to the different iWGP and target metadata for the different iWGP. In this implementation, the relative link can be used by a digital television entertainment system client to navigate from the particular iWGP to the different iWGP.

The absolute path specified by a relative link corresponds to a location on transport carousel system 218. For example, "./<path/targetFile.SVG>" represents a relative link to a file on the carousel 218. Hypertext links, specified by walled garden source content 112, that do not exhibit transitive closure (i.e., point outside of a walled garden), such as to another walled garden or application, are transcoded "as-is" in metadata 234. For example, in one implementation, a relative link is a Transport Stream (TS) Universal Resource Identifier (URL). A TS URL is a resource referencing mechanism through which an iWGP hosted by a client device 116 can access virtually any type of resource that is accessible via a digital or analog tuner. Such resources include software and/or hardware resources.

As noted above, an intrinsic event handler may be embedded into the DOM of source content 112. An intrinsic event handler specifies one or more specific functions (exposed APIs) to invoke with respect to applications co-hosted on a target set-top box 116. For example, an intrinsic event handler may be used to invoke a VOD session from an iWGP 107 and initiate the play-back of a specific VOD title. Specific syntax for a script portion of an intrinsic event handler corresponds to an exposed API of the co-hosted application, an example is: <META http-equiv="Content-Script-Type"Content="text/Basic1_0">.

By way of further examples: (a) a VOD session launch is made responsive to a subscriber click on an anchor tag corresponding to <A onclick="VOD.Buy('Some Movie Name)">metadata; (b) a force tune to a broadcast channel from an MPEG still 232 can be made when an anchor corresponding to <A onclick="TVAPI.Tune('ts://<TSI>)">metadata is selected by a user ("ts" is a locator for a particular transport stream and "TSI" represents an index to resource and channel); (c) responsive to loading a "Body" tag, or on "Frameset" tag, such as when a ticker application is launched from an MPEG still as the still is loaded with the following syntax <BODY onload="Ticker.Stocks('MSFT', 'OPTV', 'MOTO')">.

Although metadata 234 may be represented in any of a number of different data formats, this implementation generates metadata 234 in a Scalable Vector Graphics (SVG) data format. The SVG data format is a vector graphics language written in Extensible Markup Language (XML). SVG metadata for the example of FIG. 4 is based, for example, on the following structure and content:

---

EXEMPLARY METADATA STRUCTURE AND CONTENT

Page ID
Locator of background MPEG video page
Locator of audio track
Hotspot 1 //e.g., Cursor to draw over right arrow button on OSD
{
    link id, shape, size, position,
    tab-order, opacity
    Hyperlink to next SVG page (page metadata)
}
Hotspot 2 // e.g., Cursor to draw over left arrow button on OSD
{
    link id, shape, size, position,
    tab-order, opacity
    Hyperlink to previous SVG page
}
// Hotspot ...
{
    ...
}
// Hotspot N
{
    ...
}

---

The page ID substantially uniquely identifies the page generated by the source download/transcode server 216. Within each page are one or more hotspot sections that encapsulate a respective link ID. Link IDs collectively identify each of the links in the page.

When metadata 234 is loaded for presentation of still(s) 232 of an iWGP 107, the following is an exemplary sequence of events performed by a client 116. The background MPEG video still 232 is presented on the video plane. The audio track is decoded and presented by the hardware audio decoder. An element of metadata 234 is the default hotspot that is in focus when the metadata document 234 is loaded. The default hotpot is outlined with a cursor drawn on the OSD on the video plane. When the user presses remote control buttons for "left", "right", "up" or "down", the outline of the cursor is drawn at a new position on the OSD overlaying the image of the hotspot that is now in focus; the tab order of the selection is determined by the explicit tab attributes specified for each hotspot.

iWGP Broadcast Delivery

After server 216 has downloaded and converted source content 112 into one or multiple iWGP(s) 107, the server delivers program(s) 107 to carousel file system 218 for subsequent injection over broadcast network 110 to subscriber (s). Carousel file system 218 produces a real-time carousel data stream for modulation onto a six or eight megahertz channel of transmission medium 110.

In this implementation, the carousel 218 of iWGP(s) 107 are delivered to a client set-top-box 116 as a standard MPEG2 transport stream, which is broadcast in-band over some number of MHz carrier. Each iWGP is mapped to a digital service in a transport stream. The carousel file system 218 is a broadcast multiplexer that multiplexes iWGP(s) 107 over a single transport stream.

In one implementation, the in-band data modulator/up-converter 236 accepts 27 Mb/s transport streams from carousel and encodes and modulates those signals to a 238 MHz intermediate frequency. The up-converter component converts the 212 MHz intermediate signal to an RF signal and injects the RF signal into the cable system's transmission medium 110. In this manner, the 27 Mb/s MPEG2 transport streams containing iWGP(s) 107 generated by server 216 are modulated onto a six megahertz analog channel for reception by subscribers.

In another implementation, MPEG stills 232 are broadcast over the in-band channel and metadata 234 are delivered over an out-of-band channel. For instance, the stills are delivered to the set-top box 116 over an in-band channel as one or more electronic files 240, whereas corresponding metadata 234 is delivered to the set-top box 116 via an out-of-band channel as one or more electronic files 242. This alternate implementation, takes advantage of a second tuner on the client to cache metadata and thereby substantially reduce user navigation latency. To this end, carousel system 218 is coupled to an out-of-band data multiplexer/up-converter 244. The out-of-band data multiplexer/up-converter may also be used to communicate other information service-related data to the cable network.

Although FIG. 2 shows only one source download/transcode server 216 in head-end 102, two or more such servers may be installed in a head-end for purposes of increased reliability based on redundancy. Moreover, the downloading and transcoding operations performed by server 216 can be distributed across any number of computing devices, rather than being performed on a single server 216.

The Subscriber End

FIG. 5 shows exemplary digital set-top box 116 used at the subscriber end of system 100. Although not necessary to the invention, in this particular set-top box, the hardware is unmodified so that the existing base of publicly distributed set-top boxes may implement the Information Service without requiring upgrade servicing or replacement. However, to provide a service in accordance with the described arrangements and procedures to dynamically convert downloaded source content 112 to broadcast ready MPEG 107 program(s) for substantially optimized broadcast delivery to the set-top box, the operation of the box 116 is modified by additional software downloaded thereto. Such additional software includes iWGP Navigator module 124 (also shown in FIG. 1), which is a computer-program module that communicates with an operating system 502 of the box 116 by placing calls through an application programming interface (API) 504, as described in more detail below.

As shown in FIG. 5, the digital cable box 116 includes in-band tuner 506 and out-of-band tuner 508, along with respective demodulators 510 and 512. Microprocessor 514 controls the tuning operations of tuners 506 and 508 based on commands received from a subscriber via an input device such as a keypad or an infrared remote control device 516, as described below. To this end, set-top box 116 includes infrared sensor 518 connected to an infrared receiver 520, which provides the command signaling information to the microprocessor 514. Memory system 522 includes operating system 502 stored therein, and preferably comprises a combination of volatile dynamic RAM 524 and non-volatile RAM (NVRAM) 526. Memory system 522 further includes data 544 and log data 546. Memory system 522 is connected to modem 548, which is in turn connected to upload server 550.

In this implementation, iWGP content is broadcast across digital channels as MPEG transport packets onto a six megahertz analog channel. The set-top box 116 includes some number of packet identification (PID) filters, which in this example are three (3) filters 528, 530, 532, to extract the appropriate encoded data packets for an application selected digital channel. The audio, video, and metadata content corresponding the iWGP are each respectively encapsulated in transports packets assigned PIDs that are substantially unique within the scope of the transport stream. The digital service is associated via program specific information (PSI) to the metadata component, which in turn references the corresponding video and/or audio. One of the video and audio components may be declared in the PSI to supply a splash screen for presentation upon client tuning to the iWGP host digital service.

Based on the selected channel, microprocessor 514 writes an identification value to each PID filter 528, 530, 532, whereby the filters 528, 530, 532 pass only those packets corresponding to that value. As shown in FIG. 5, one of the PID filters, filter 528, provides the filtered packets to an audio decoder 534 which decodes the digital audio data 235 (encoded, for example, according to the AC3 format), while another PID filter 532 provides filtered MPEG still frame packets 232 to the video decoder 536.

In addition to line-level audio and video outputs, the resulting video signal may be output from the set-top box 116 with separate luminance and chrominance signals (SVHS format). Set-top box 116 may also contain a modulator (not shown) for combining the audio and video signals onto a modulated carrier channel such as channel 3 or 4, for compatibility with television sets not having separate audio and video inputs.

Third PID filter 530 is provided to extract in-band and out-of-band data such as metadata 234 associated with corresponding MPEG still frames 232. As described above, the metadata describes links to other MPEG stills, other set-top box 116 co-hosted applications (e.g., an electronic programming guide (EPG), a VOD, and/or other applications), along with data describing any number of side effects and actions. A user can select and activate the links with a hand-held remote control, thereby interacting with the pages of information displayed on the television screen or switching to the referenced application. Packet processor 538 handles those packets by communicating them to navigator 124.

In this implementation, wherein metadata 234 is represented in an SVG data format, iWGP Navigator 124 uses an SVG rendering engine 531 running on middleware to render a cursor on the set-top on-screen display frame buffer (OSD) over each hotspot on a displayed MPEG still 232. (Using meta-tags in source content 112, which is parsed by the transcode server 216 into metadata 234, an author is able to indicate cursor attributes to the iWGP Navigator 124 on a per page basis). OSD 540 is capable of superimposing alphanumeric characters, other symbols and bitmap graphics over a displayed image. To accomplish this superimposition, overlay 542 is provided to appropriately combine the video outputs of the video decoder 536 and the OSD 540.

Cable box 116 functions when the user provides an appropriate and valid command to the cable box. For example, in response to a digital channel selection command, the microprocessor tunes the in-band tuner 506 to an appropriate analog channel based on the digital channel selected by the subscriber. If a digital channel was selected, a table or the like stored in memory 522 determines the analog channel that carries the digital channel's packets, along with the packet identification numbers corresponding to that channel, for writing into PID filters 528 and 532. Once the PIDs have been written, audio and video decoders 536 and 534 will receive the appropriate packets and decode and output appropriate signals. As described below, some of the packets will include iWGP(s) 107 that have been dynamically generated at headend 102.

Figure 6:
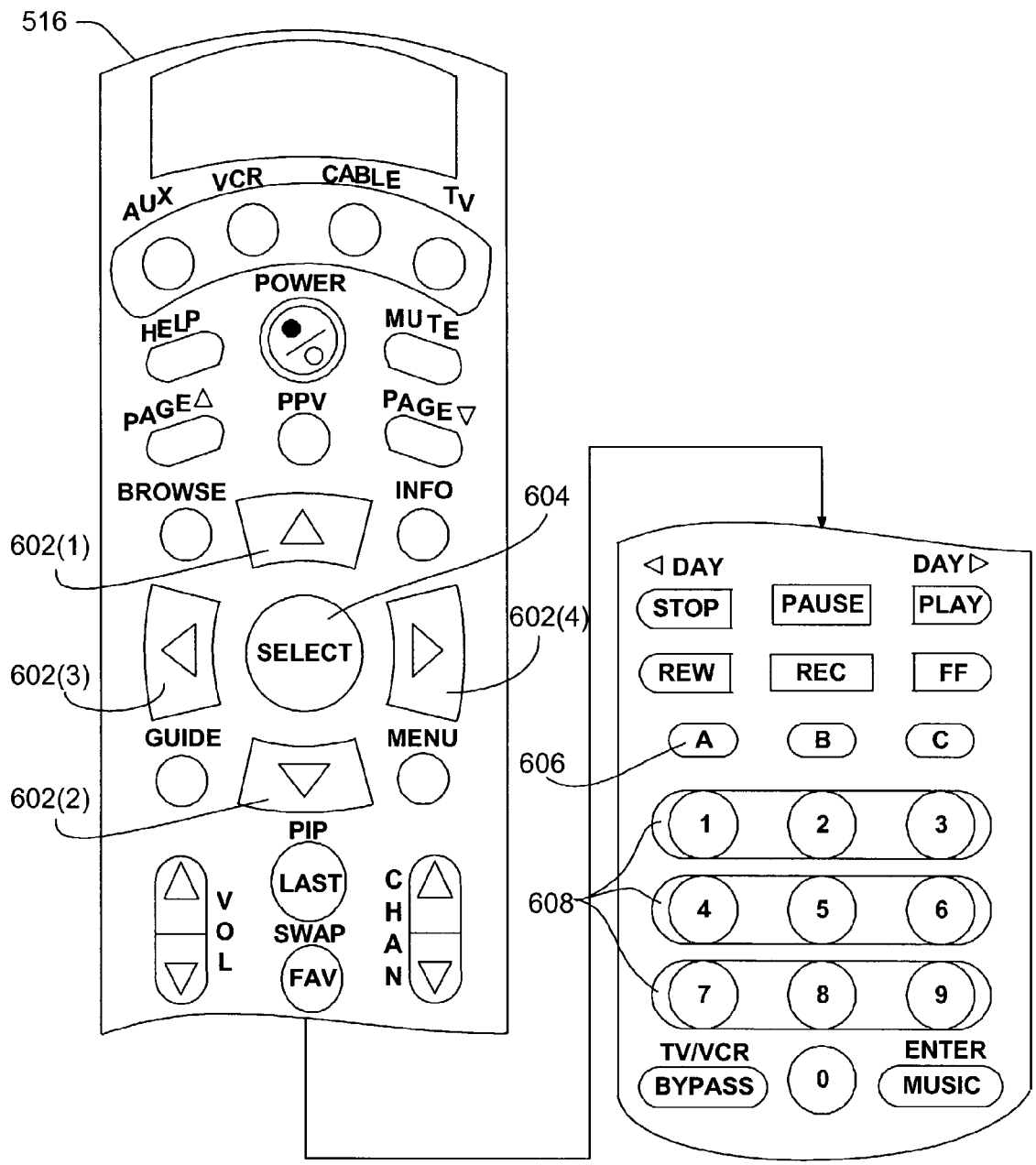
FIG. 6 shows client-side input device, such as an exemplary hand-held remote control.

FIG. 6 shows an exemplary client-side input device. The subscriber also will be provided with an input device such as hand-held remote control 516 of FIG. 6. In one implementation, the input device includes four directional (up, down, left and right cursor) buttons, 602(1)-602(4) respectively, and a "SELECT" button 604. The remote control 516 may include a dedicated button, chosen as the "A" button 606 of FIG. 6, which may be used to enter the information service in one alternative scenario described below. In one implementation, the remote control input device will also provide the normal complement of TV-related buttons including a numeric keypad 608, volume adjustment, channel adjustment, mute and so on. Other buttons such as those for control of a videocassette recorder also may be provided. The remote control is wireless, e.g., an infrared or RF-based remote control, but of course alternatively may be wired. Moreover, alternate input devices need not be remote, but may for example, be provided as a keypad (not shown) on a set-top box.

An Exemplary iWGP Navigator Module

A user or subscriber utilizes set-top box 116 to display, listen, and/or interact with cable data provided via head-end 102. In particular, the user utilizes set-top box 116 to display, listen, and/or interact with iWGP(s) 107 generated by head-end 102. To this end, iWGP navigator module 124 has been downloaded into memory 522 of set-top box 116, along with APIs 504 for interfacing the iWGP navigator module to operating system 502 of the set-top box.

In one scenario, when a subscriber tunes (e.g., via remote control 516) to a specified channel reserved for the Information Service of system 100 of FIG. 1, iWGP navigator 124 enables the subscriber to browse iWGP(s) 107 broadcast on the cable network. The user can launch the navigator from other co-hosted set-top applications, such as from a menu within the EPG. Once an iWGP is launched, the subscriber may navigate from one still 232 to another still 232 and from one program 107 to another program 107.

For instance, when the user presses a directional cursor button on input device 516 such as represented by buttons 602(1)-602(4), the navigator module 124 reads metadata 234 associated with the displayed MPEG still 232 to perform possible actions. Examples of some possible actions include adjusting focus, tabbing through links, hyper-linking to another MPEG still 232, hyper-linking from the navigator module 124 to another application (e.g., an EPG), etc.

Cable boxes typically provide APIs 504 to control the tuner and selection of program elements in the MPEG2 stream. iWPG navigator module 124 uses such an API (in the APIs 504) to specify the digital channel corresponding to the appropriate iWGP 107 on the carousel 218, whereby processor 514 in set-top box 116 tunes in-band tuner 506 to the appropriate carrier and selects the program (Service) corresponding to the desired page group. The mapping between digital channels and carousel page programs is fixed and may be mapped to virtual channels for selective control of user channel access. The iWPG navigator selects the program element (service component) containing the carousel page for display, and uses an API (or the like) to select the Video Program Element for display. As a result, the PID is written to PID filter 532 and the page image is decoded and displayed by the hardware.

iWPG navigator 124 selects the program component that carries metadata 234 for page group 107. Page metadata is organized in the carousel file system. Each iWGP page has an associated metadata file. Cable boxes 116 may provide a carousel file system client access to specific metadata files in the carousel. The iWPG navigator reads the page metadata, which includes a record for each hotlink on the page. Each hotlink record includes information such as the geometry of focus for that hot-spot and other information specific to the hot-spot.

For anchor elements, the record includes the file name of the target iWGP page metadata 232 to which the link refers. Note that the carousel 218 contents are described by the carousel metadata, which is carried in-band or out-of band. Where the hot-spot indicates a link to a page in a different iWGP, the record includes a reference to the particular digital service on which the target program is broadcast in addition to a metadata file name corresponding to the target page in the program.

After metadata 234 has been read by iWPG navigator 124, the iWPG navigator draws focus on a default link as specified by the page metadata. At this time, displayed still 232 is ready for user-interaction. For example, iWPG navigator draws focus on other links as-they are tabbed to by the user, according to the focus chain specified in the page metadata. Accordingly, when the user moves focus to a hyperlink, the module 124 simply draws focus, using OSD 540, on some region of the screen as indicated by geometry information in page metadata. When the user selects the link, the iWPG navigator changes the display to the destination page as indicated by the link data in the former page's metadata.

An Exemplary Procedure

Figure 7:
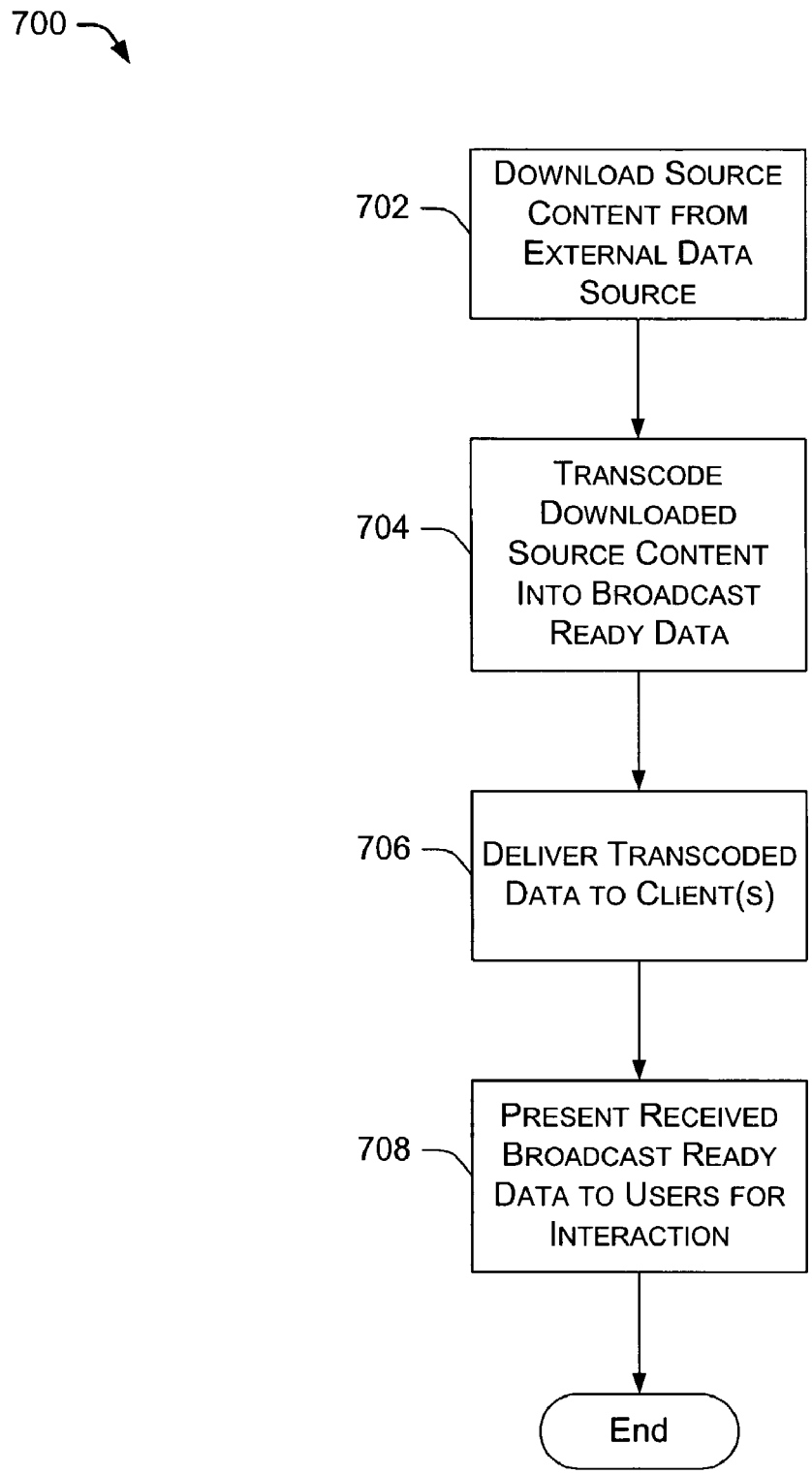
FIG. 7 shows an exemplary procedure to dynamically convert downloaded Web content into multiple MPEG stills and corresponding metadata for use by clients in a digital television network. This converted data is substantially optimized for broadcast delivery to a client in a one-way digital entertainment infrastructure.

FIG. 7 shows an exemplary procedure 700 to dynamically convert downloaded HTML content into data that can be presented and navigated by resource constrained clients in a digital television network. This converted data is substantially optimized for broadcast delivery to a client in a one-way digital entertainment infrastructure. At block 702, server 216 actively gathers source content 112 from an external data source 106. As noted above, this data fetching operation is performed according to parameters indicated by configuration data 230. At block 704, server 216 transcodes the downloaded source content into an iWGP 107, comprising one or more still(s) 232, metadata 234, and optional audio 235 components. In one implementation, hereinafter referred to as a non-layering implementation, there is a one-to-one mapping between an MPEG still 232 and an interface page in the downloaded source content 112. That is, a single MPEG still 232 is generated from all background, image, and text components of a single interface page 112 (e.g., a Web page).

In other implementations, described in the following alternative implementations section, there is a many to one relationship between the numbers of MPEG stills 232 generated from a single interface page. That is, multiple MPEG stills 232 are generated to respectively represent various background, image, and possibly text components of a single interface page. In another implementation, text is extracted from background, and/or text layers of an interface page 112. The extracted text is not represented with an MPEG still, but rather embedded into metadata 234 for later rendering onto an OSD layer at the client 114.

At block 706, the head-end 102 delivers the transcoded source content as an iWGP 107 to one or more clients 114. At block 708, the iWGP navigator 124 presents received broadcast content 107 to users for interaction.

Alternate Implementations

Interface pages, such those generated by server 216 of FIG. 2 may be bandwidth intensive. To substantially optimally reduce the amount of bandwidth used to deliver broadcast-ready-data, information system 100 of FIG. 1 utilizes one or more of the following bandwidth optimization techniques: (a) sharing background, image, and/or text layer instances (i.e., page layering) across corresponding MPEG pages 232; and (b) page layering with text overlay.

Interface Page Layering

Figure 8:
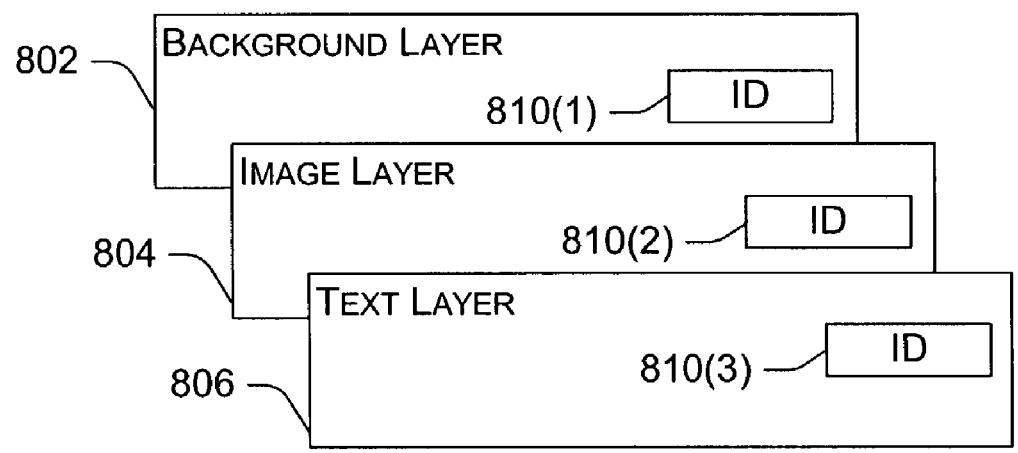
FIG. 8 shows aspects of an exemplary Web page, including a background layer, image layer, and a text layer.

FIG. 8 shows aspects of an exemplary interface page of one or multiple interface pages that comprises source content 112 of FIG. 1. The interface page includes certain content characteristics such multiple layers, each layer being of a particular "layer type". Layer types include a background layer 802, an image layer 804, and a text layer 806. Groups of Web pages (i.e., source content 112) such as those found in a walled garden may share such content characteristics exemplified by particular layer types.

For instance, information listings (e.g., cinema listings, sports scores, VOD titles listings, program guide listings, train schedules, etc.), weather, news, and other genres of source content 112, may share a substantially similar background, image, text, and/or interaction models with respect to one another (i.e., across multiple Web pages). For purposes of this discussion, substantially similar means identical at least in some respects. Groups of Web pages that share components, elements, or characteristics can be substantially optimized for broadcast delivery to subscribers.

For instance, during generation by server 216 of an iWGP 107 from a group of Web pages, background, image, and text characteristics that are common across the Web pages are identified. Regardless of the number of Web pages in which such a shared component is identified, only a single instance of the shared component is transcoded from a group of Web pages into the iWGP for delivery to a client 114. As discussed below, this single instance of shared content is reused at the client (i.e., by the Navigator module 124) for presentation of the interface pages of the iWGP 107.

Figure 9:
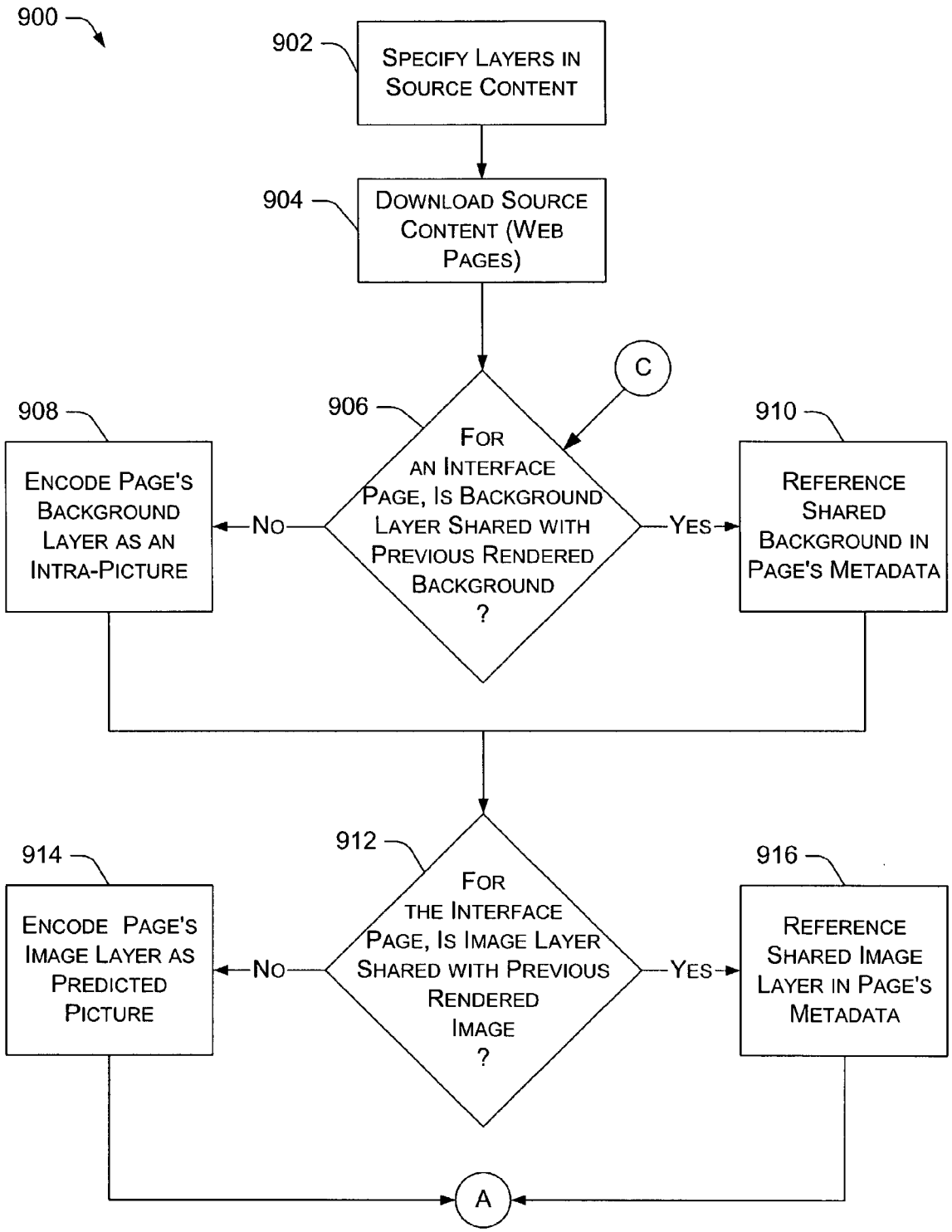
FIG. 9 shows an exemplary procedure to share downloaded Web page layers across dynamically generated broadcast ready content to substantially optimize bandwidth used.

FIG. 9 shows exemplary procedure 900 to share downloaded Web page layers across dynamically generated broadcast ready content. At block 902, source content 112 is authored to isolate background, image, and text component layers in at least two Web pages of a group of Web pages (e.g., a walled garden Web site). For example, for each source content page 112, a first anchor tag of the DOM specifies a background layer 802 with a substantially unique ID 810(1), a second tag identifies an image layer 804 having a substantially unique ID 810(2), a third tag identifies a text layer 806 comprising a substantially unique ID 810(3), and so on.

At block 904, server 216 downloads the group of Web pages as specified by parameters in configuration data file 230.

At blocks 906, 908, 910, 912, 914, and 916, the server 216, for each downloaded interface page in a group of downloaded source content 112 (e.g., from a walled garden Web site), represents each interface page as a GOP. In other words, each interface page is represented with as many bitmaps as there are layers, although one or more representative bitmaps may be referenced if they are shared or common with other interface page(s).

More particularly, at block 906, server 216 determines if a background layer of an interface page has already been rendered for the group of content. If not, at block 908, the background layer is rendered into a bitmap and encoded as an MPEG intra picture 232 of an iWGP 107. Whereas, if the background layer of an interface page has already been rendered for the group of content, at block 910, server 216 references the shared background layer's corresponding bitmap in the current page's metadata 234 (i.e., via PID or filename), rather than again rendering the shared content. In other words, if a current Web page shares a common background with a different and already rendered Web page, then metadata 234 for the current page is generated to reference the MPEG still 232 associated with the background layer of the different page.

Figure 10:
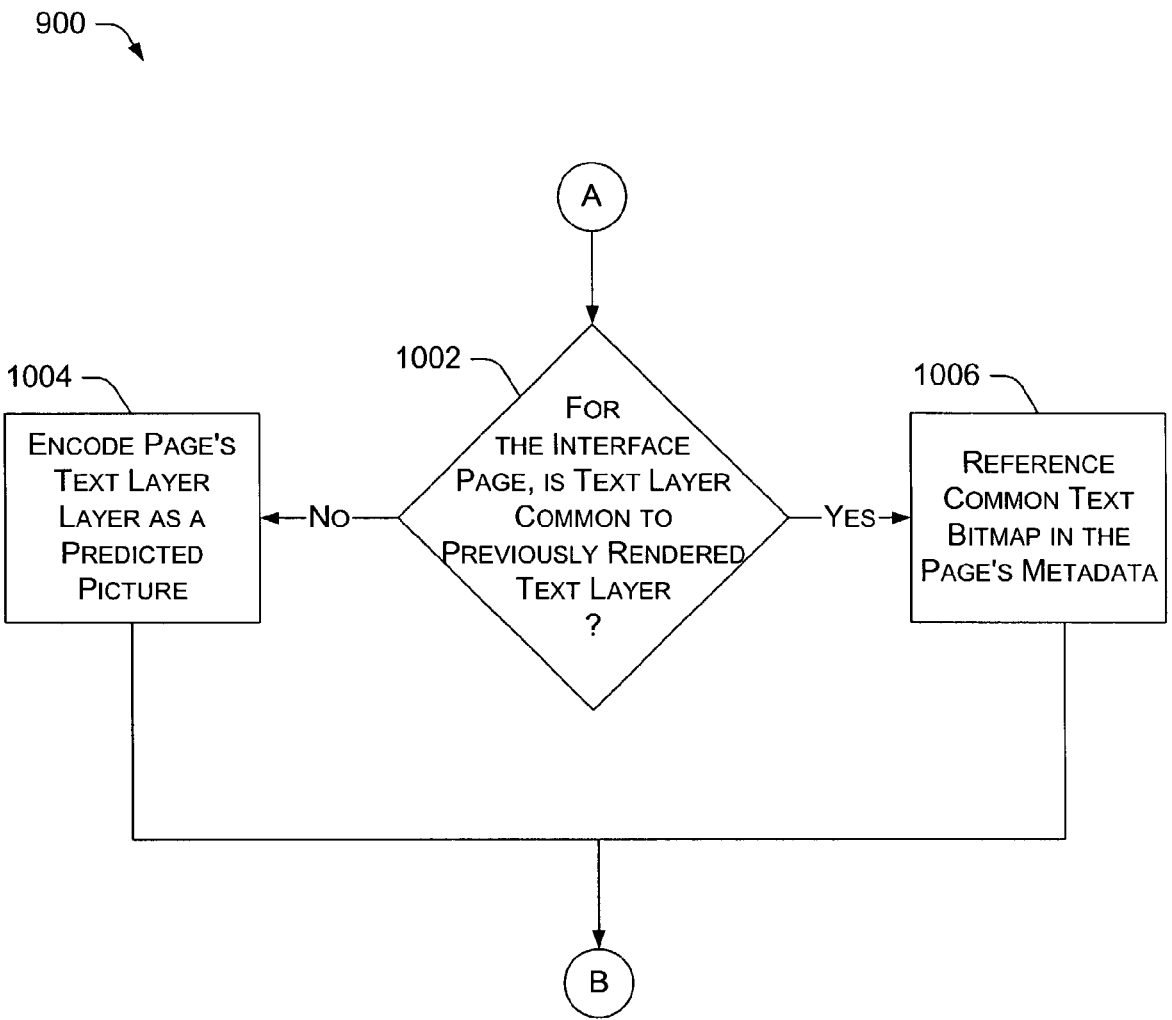
FIG. 10 shows further exemplary aspects of the procedure of FIG. 9 to share downloaded Web page layers across dynamically generated broadcast ready content.

At block 912, server 216 determines if an image layer of the current Web page has been rendered for the group of content. If not, at block 914, the image layer is rendered into a bitmap and encoded as an MPEG predicted picture 232 (i.e., calculated based on the background layer). Whereas, at block 916, the image layer of the Web page being common to an already rendered page for the group of content, the rendered page is referenced in the current page's metadata 234 (i.e., via PID or filename) (rather than again rendering the shared image layer). The procedure 900 continues at block 1002 of FIG. 10, as indicated by on-page reference "A".

Figure 11:
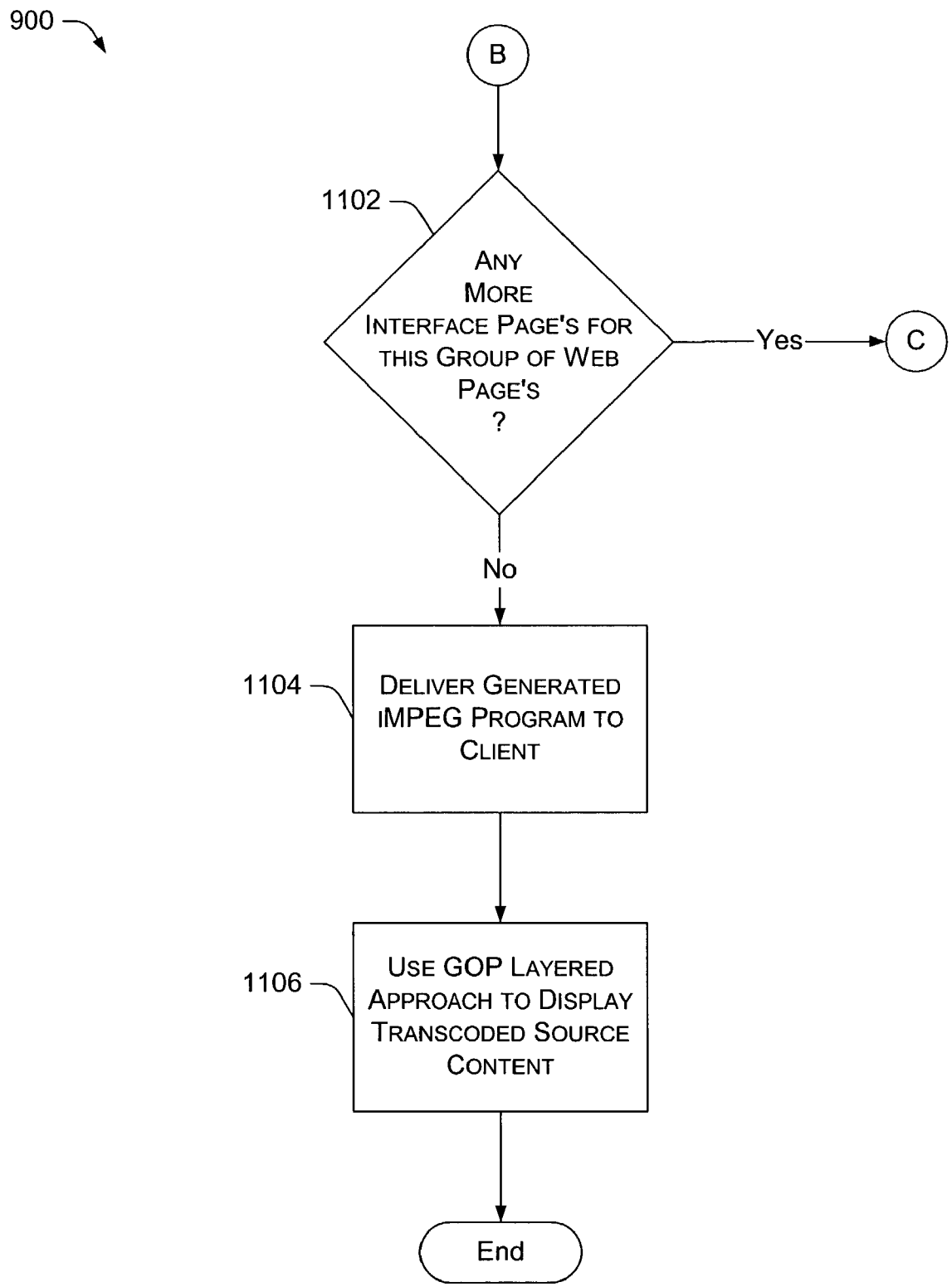
FIG. 11 shows further exemplary aspects of the procedure of FIGS. 9-10 to share downloaded Web page layers across dynamically generated broadcast ready content.

At block 1002, server 216 determines if a text layer of the current Web page has been rendered for the downloaded group of content 112. If not, at block 1004, the text layer is rendered into a bitmap and encoded as an MPEG predicted picture 232 (i.e., predicted based on the image layer). Whereas, at block 1006, the text layer of the Web page being common to an already rendered page for the group of content, the rendered page is referenced in the current page's metadata 234 rather than again rendering the shared text layer. In one implementation, such a reference to the shared rendering is made via PID or filename. The procedure 900 continues at block 1102 of FIG. 11, as indicated by on-page reference "B".

At block 1102, server 216 determines if there are any more interface pages in the downloaded source content 112. If there are more pages to encode/reference, the procedure 900 decodes/references the next Web page by continuing at block 906 of FIG. 9, as indicated by on-page reference "C". Otherwise, the procedure 900 continues at block 1104, wherein server 216 delivers the generated iWGP 107 to the client. Procedure 900 continues at block 1106, to use a GOP layered approach to display transcoded source content.

MPEG encoded pictures 232 or layer instances are broadcast in a transport stream to client(s) 114. The MPEG pictures can be sent as exclusive video components. Each MPEG encoded layer instance is broadcast in decode order to the client. Alternately, MPEG pictures may be sent on a carousel file system 218 on a data component. If using the file system carousel, a temporal reference to a shared/common component or layer may be specified in the metadata 234 for each layer instance. This temporal reference indicates a decode order for the multiple MPEG stills 232 that represent an interface page 112.

For instance, in one implementation, metadata 234 indicates that the background layer has temporal reference of zero (0), the image layer has temporal reference of one (1), and the text layer has temporal reference of two (2), indicating that the background layer is decoded first, the image layer second, and the text layer 3rd. The metadata is sent in the carousel file system on a data component (e.g., an OOB connection) as noted above. In another implementation, and as discussed below in reference to page layering with text overlay, text is not represented with an MPEG still, but rather extracted from a layer and encoded into the metadata as ASCII text. In this case, the text is rendered onto the OSD of the client set-top box. The metadata along with the text is also compressible.

At block 1206, client 112, and in particular, iWGP navigator 124 of FIG. 1 displays each GOP corresponding to the received transcoded source content 114. Using a non-layered approach, each interface page is encoded as a single MPEG still 232, and displayed using a basic off-the-shelf MPEG viewer (i.e., a portion of the iWGP navigator). Using the layered approach each interface page 112 comprises multiple layers is encoded by server 216 with multiple pictures 232 (one picture for each layer). To view the transcoded interface pages 232, a viewer portion of the iWGP navigator decodes a GOP (i.e., a group of MPEG stills 232) rather than a single MPEG still 232 to represent a single Web page.

To accomplish this, metadata 234 corresponding to each downloaded interface page 112 references pictures 232 or instance layers that comprise the page video layer. iWGP navigator 124 extracts and decodes the pictures or instance layers in the broadcast iWGP 107 in the order they are received from the transport stream. If the pictures or instance layers are broadcast by way of a file system carousel 218, then the navigator uses a temporal reference as discussed above specified in the metadata for determining the picture decode order.

Accordingly, in the page layering approach of procedure 900, common interface or Web page characteristics (e.g., background, image, text, etc.) are shared across multiple MPEG stills 232 in an iWGP 107. In this manner, server 216 substantially reduces the amount of bandwidth that otherwise would have been needed to deliver corresponding broadcast data to a client 114; the broadcast data representing source content 112 that has been transcoded into an iWGP. This is in contrast to the non-layered scenario, wherein all interface page components are considered to reside on a common layer and each Web page is rendered in its entirety into broadcast ready content.

Page Layering with Text Overlay

Page layering with text overlay for dynamic generation and substantially optimized broadcast delivery of rich interface content to a client such as a set-top box or DVR extracts a text layer from downloaded source content 112, as described in the immediately preceding section. Yet, rather than encoding the extracted text layer as a predicted MPEG still 232, the text layer is converted into text data. The text data is then embedded into metadata 234. In one implementation, the text layer includes text font, wrap, and/or other text attributes.

More particularly, page layering with text overlay is performed such that interface pages 112 are broken up by the source download/transcode server 216 into a background layer 802, an image layer 803 and text objects (i.e., represented as "other data" 231 of FIG. 2) encoded in broadcast metadata. The compounded bandwidth savings of page layering with text layering is significant for certain types of content such as in information listing content.

Figure 12:
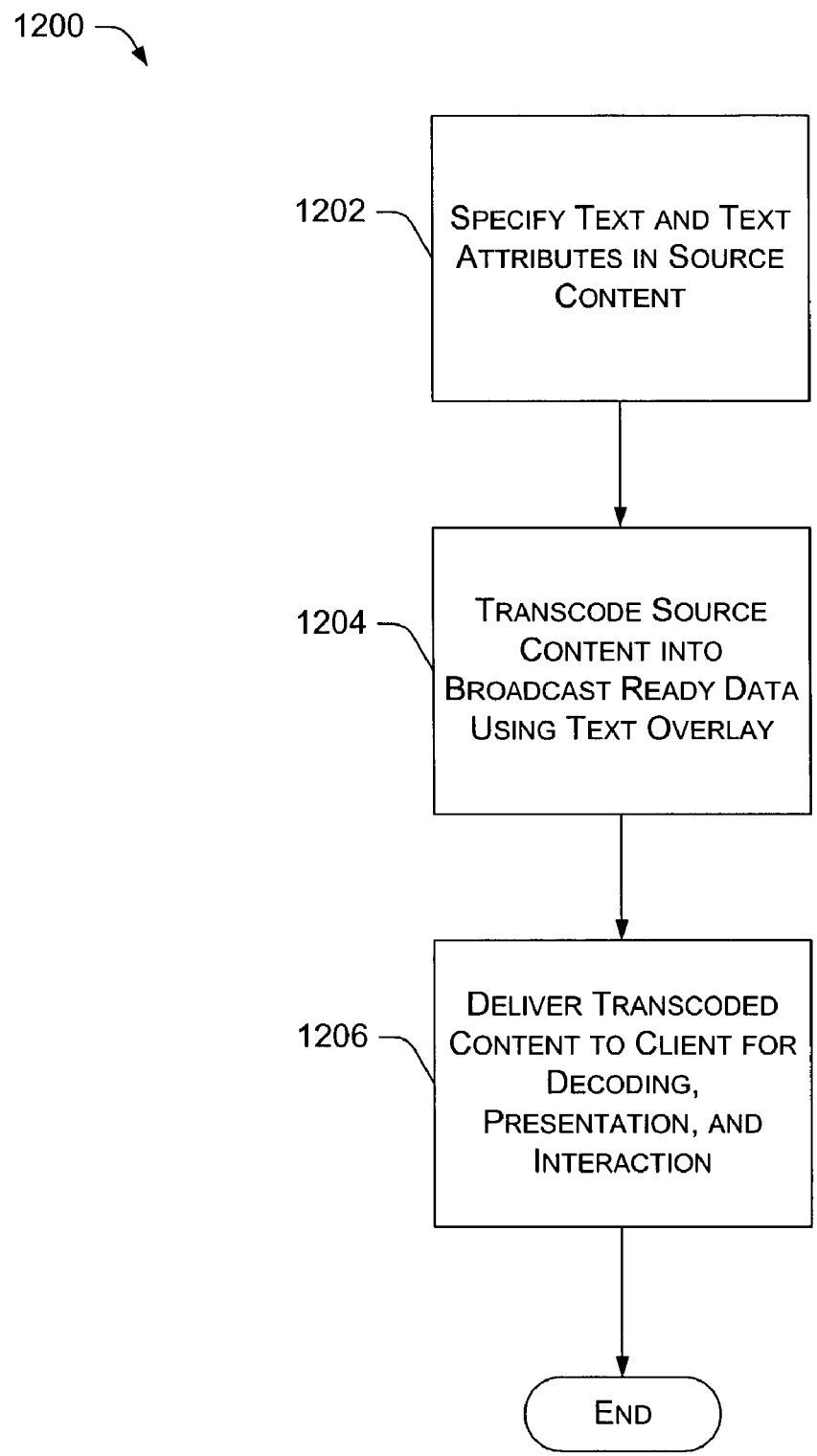
FIG. 12 shows an exemplary procedure to dynamically convert downloaded Web content in Web data format into iWGP(s) using one or more text overlays for substantially optimized broadcast delivery to a client.

FIG. 12 shows an exemplary procedure 1200 to dynamically convert downloaded Web content into broadcast-ready-data using one or more text overlays for substantially optimized broadcast delivery to a client. At block 1202, text and text attributes (e.g., line wrap, font type, size, etc.) attributes are specified in the source content 112. Source content that is authored with image layer re-use in mind assures some degree of bandwidth savings. When authoring source content for page layering with text overlay, text intended for extraction from a background layer 802 is specially tagged so that it is lifted by the transcode server 216 as text, rather than being encoded in one or more relatively bandwidth intensive MPEG pictures 232 (e.g., as part of an image layer 804). Additionally, text can be marked up to indicate wrap points. Where possible, the content author should use text compatible with the client 114 supported font set. Text that is not supported by a font set implemented at the client 114 can be kept in the image layer.

At block 1204, the procedure 1200 transcodes the source content 112 into broadcast-ready-data 114 using text overlay.

FIG. 13 shows further details of the transcoding operation of block 1204 of FIG. 12. The operation of block 1204 is performed for each layer of each interface page 112 in a group of interface pages (e.g., Web pages from a walled garden Web site). In particular, at block 1302, for an interface page, and for a layer (e.g., background, image, and/or text layers) of the interface page, the procedure determines if the layer has previously been rendered.

If the layer is determined to have already been rendered for a different interface page, then the layer is shared between the current interface page and the different interface page. Accordingly, at block 1304, the procedure references the video component generated from the previously rendered layer in the current page's metadata. In this manner, the previously rendered video component can be reused to render, by a client 114, all of the video components corresponding to the current interface page.

Otherwise, the layer has not been previously rendered, at block 1306 the procedure determines if the layer is a text layer 806 of FIG. 8. If so, at block 1308, all of the text from the text layer is extracted and stored into the current interface page's metadata 234. Extracting text layer(s) 806 from downloaded source content 112 and encoding corresponding text data 231 into metadata 234 will use less bandwidth during client delivery operations as compared to bandwidth generally used when delivering an MPEG picture representing the text layer. Such bandwidth savings are especially prevalent when the text layer is not shared across multiple interfaces pages 112.

In one implementation, a text layer is generated for every MPEG still 232 in a program 107. This text layer is reduced in code size because the data for the text layer is encoded in metadata 234. This metadata can also be compressed to save additional bandwidth.

At block 1310, it is determined whether the current page has a next layer that has not yet been processed. If so, processing returns to block 1302 to process the next layer. Otherwise, at block 1312, the procedure determines whether there is a next page to process. If so, processing returns to block 1302 to process each of the layers of the next page. If not, referring to FIG. 12, operations continue at block 1206, wherein the transcoded content 114 is delivered to the client 114 for subsequent decoding, presentation, and user interaction.

At block 1316 of FIG. 13, it having been determined that the layer being processed is not a text layer (block 1306), the procedure determines if the layer (e.g., a background layer) includes any text marked for extraction (e.g., text having a font supported by the client 114). If no text is marked for extraction, block 1322 renders the layer into an MPEG still 232. The procedure continues at blocks 1310 and possibly 1312, as discussed above.

If the layer has text marked for extraction (block 1316), block 1318 extracts the marked text from the layer. At block 1320, the extracted text is stored into metadata 234 corresponding to the broadcast data being generated for the current interface page 112. At block 1322, the layer minus the extracted text (block 1320) is rendered into an MPEG still 232. When decoded at the client 114, the extracted text is displayed on top of this rendered still. The procedure continues at blocks 1310, as already discussed.

The navigator program module 124 at the client 114 decodes video component(s) for each MPEG still 232 renders the text objects/layers per the text data including, for example, font and text wrapping attributes as indicated in the page metadata 234. As discussed above, the text is displayed on the OSD using the native graphics engine.

Conclusion

The described systems and methods substantially optimize broadcast data for delivery to clients in a television-based entertainment infrastructure. Although the systems and methods to generate bandwidth optimized broadcast data have been described in language specific to structural features and methodological operations, the subject matter as defined in the appended claims are not necessarily limited to the specific features or operations described. Rather, the specific features and operations are disclosed as exemplary forms of implementing the claimed subject matter.

The invention claimed is:

1. In a television entertainment system, a method for substantially reducing an amount of bandwidth used to deliver broadcast data, the method comprising:
    identifying at a cable head-end, for reuse during transcoding operations at the cable head-end, substantially similar layers across multiple pages of Web content, wherein layers comprise at least one of a plurality of layer types, wherein the plurality of layer types includes at least a background layer type, an image layer type, and a text layer type; and
    transcoding, at the cable head-end, the multiple pages of Web content into an interactive program comprising multiple video components, the multiple pages of Web content being transcoded such that a layer that is similar across multiple ones of the pages is not encoded into a respective video component for each similar occurrence of the layer, the layer and all other similar layers being represented in the interactive program with a single still of the video components and metadata;
    wherein along a stream of still images, the interactive program includes corresponding metadata, wherein the metadata provides an interaction model for navigating the multiple pages of Web content which have been transcoded into the interactive program comprising multiple video components, the metadata identifies client presentation layout characteristics of the video components, and wherein transcoding further comprises, for a page of the pages:
        (a) extracting text from a layer of the layers;
        (b) encoding the text into the metadata; and
        (c) rendering the layer as a bitmap that does not include the text; and
    wherein the interaction model facilitates interaction via a subscriber terminal without the need for a web browser.

2. A method as recited in claim 1, wherein the pages are in a Hypertext Markup Language (HTML) data format.

3. A method as recited in claim 1, wherein the video components are Moving Pictures Experts Group (MPEG) stills.

4. A method as recited in claim 1, wherein before transcoding, the method further comprises authoring one or more of the pages to indicate individual layers.

5. A method as recited in claim 1, wherein before transcoding, the method further comprises fetching the Web content from an external content provider, and wherein the transcoding is performed by a server at a cable head-end.

6. A method as recited in claim 1, wherein transcoding further comprising encoding multiple video components from a single page of the pages, each of the multiple video components corresponding to a respective page layer.

7. A method as recited in claim 1, wherein multiple pages of the Web content comprise individual instances of substantially similar layers, and wherein transcoding further comprises:
    rendering one of the individual instances for only a first page of the multiple pages to generate the single shared video component; and
    referencing the single shared video component in metadata corresponding to each other page of the multiple pages that is not the first page.

8. A method as recited in claim 1, wherein transcoding further comprises, for each video component, assigning a temporal reference to indicate a decode order for the client.

9. A method as recited in claim 1, further comprising delivering the video components to the client in decode or non-decode order.

10. A method as recited in claim 1, wherein transcoding further comprises:
    encoding a background layer as an intra picture;
    encoding an image layer of the layers as a predicted picture, the predicted picture being calculated from the intra picture; and
    wherein the intra picture and the predicted picture are video components.

11. A method as recited in claim 10, wherein the predicted picture is a first predicted picture, and wherein transcoding further comprises encoding a text layer as a second predicted picture, the second predicted picture being based on the first predicted picture, the second predicted picture being a video component of the video components.

12. A method as recited in claim 1, wherein extracting the text further comprises extracting text attributes from the layer, and wherein transcoding further comprises embedding the text attributes into metadata that corresponds to the page.

13. A computer-readable medium comprising computer-program instructions executable by a processor to perform operations as recited in the method of claim 1.

14. A head-end server comprising a processor coupled to a computer-readable medium comprising computer-program instructions executable by the processor, the computer-program instructions performing operations as recited in the method of claim 1.

15. A computer-readable medium having processor-executable instructions embodied thereon, the processor-executable instructions when executed configuring a computer to perform a method comprising:

identifying at a cable head-end, for reuse during transcoding operations at the cable head-end, a plurality of interface pages, individual ones of which have multiple component layers, identifying at least two instances of a substantially similar layer of the multiple component layers, multiple ones of the interface pages having respective instances of the substantially similar layer, wherein layers comprise at least one of a plurality of layer types which include at least a background layer type, an image layer type, and a text layer type; and transcoding, at the cable head-end, the interface pages into an interactive program comprising multiple video components, the multiple pages of Web content being transcoded such that a layer that is similar across multiple ones of the pages is not encoded into a respective video component for each similar occurrence of the layer, the layer and all other similar layers being represented in the interactive program with a single still of the video components and metadata;

wherein along a stream of still images, the interactive program includes corresponding metadata, wherein the metadata provides an interaction model for navigating the multiple pages of Web content which have been transcoded into the interactive program comprising multiple video components, the metadata identifies client presentation layout characteristics of the video components, and wherein transcoding further comprises, for a page of the pages:
(a) extracting text from a layer of the layers;
(b) encoding the text into the metadata; and
(c) rendering the layer as a bitmap that does not include the text; and wherein the interaction model facilitates interaction via a subscriber terminal without the need for a web browser.

16. A computer-readable medium as recited in claim 15, wherein transcoding further comprises:
encoding the substantially similar layer for a first one of the multiple ones into the single video component; and
for individual ones of the multiple ones that are not the first one, referencing the single video component in metadata for layer reuse.

17. A computer-readable medium as recited in claim 15, wherein the interactive program is in a Hypertext Markup Language (HTML) data format, and wherein the single video still is in an interactive Moving Pictures Experts Group (MPEG) data format.

18. A computer-readable medium as recited in claim 15, before the instructions for identifying, further comprising computer-program instructions for downloading the interface pages from an external Web data source.

19. A computer-readable medium as recited in claim 15, wherein the computer-program instructions further comprise instructions for delivering the interactive program as multiple video components and corresponding interaction model metadata to a client in a television entertainment system, the multiple video components being delivered for receipt by the client in decode or non-decode order.

20. A computer-readable medium as recited in claim 15, wherein the interactive program comprises multiple video components, and wherein the computer-program instructions for transcoding further comprise instructions for:
encoding a background video component as an intra picture;
encoding an image video component as a first predicted picture based on the intra picture; and
encoding a text video component as a second predicted picture based on the first predicted picture.

21. A computer-readable medium as recited in claim 15, wherein the computer-program instructions for transcoding further comprise instructions for:
for at least one page of the interface pages:
(a) extracting text; and
(b) encoding the text into metadata for delivery to a client, the text not being represented in the interactive program as a video component.

22. A cable head-end server coupled over a network to an external data source and a client computing device, the server comprising:
a processor; and
a memory coupled to the processor, the memory comprising computer-program instructions that are executable by the processor to perform a method comprising:
downloading Web content from the external data source;
identifying for reuse during transcoding operations at the cable head-end server, multiple instances of substantially similar layers of content across multiple pages of the Web content, wherein layers comprise at least one of a plurality of layer types, wherein the plurality of layer types includes at least a background layer type, an image layer type, and a text layer type; and
transcoding the multiple pages of Web content into an interactive program comprising multiple video components, the multiple pages of Web content being transcoded such that a layer that is similar across multiple ones of the pages is not encoded into a respective video component for each similar occurrence of the layer, the layer and all other similar layers being represented in the interactive program with a single still of the video components and metadata wherein the metadata identifies client presentation layout characteristics of the video components, and wherein transcoding further comprises, for a page of the pages:
(a) extracting text from a layer of the layers;
(b) encoding the text into the metadata; and
(c) rendering the layer as a bitmap that does not include the text.

23. A cable head-end server as recited in claim 22, wherein the similar content corresponds to a particular layer of multiple component layers, each page of the multiple pages comprising the multiple component layers.

24. A cable head-end server as recited in claim 22, wherein the similar content is a background layer, an image layer, or a text layer.

25. A cable head-end server as recited in claim 22, wherein the Web content is in a Hypertext Markup Language (HTML) data format.

26. A cable head-end server as recited in claim 22, wherein the computer-program instructions further comprise instructions for delivering the multiple video stills to the client in decode or non-decode order, a decode order being specified by the interaction model metadata.

27. A cable head-end server as recited in claim 22, wherein the Web content comprises multiple interface pages each of which consist of multiple component layers, and wherein the computer-program instructions for transcoding the Web content further comprise instructions for:
encoding a background layer of the multiple component layers as an intra picture;

encoding an image layer of the multiple component layers as a first predicted picture that is predicted from the intra picture; and encoding a text layer of the multiple component layers as a second predicted picture that is predicted from the first predicted picture.

28. A head-end server in a television entertainment infrastructure, the head-end server comprising:

means for downloading Web content comprising a plurality of interface pages, each interface page comprising a plurality of layers, each layer being a particular one type of multiple layer types;

means for identifying for reuse during transcoding operations at the head-end server, substantially similar layers across multiple of the interface pages of Web content, wherein layers comprise at least one of the multiple layer types, wherein the multiple layer types include at least a background layer type, an image layer type, and a text layer type; and means for transcoding the multiple interface pages of Web content into an interactive program comprising a plurality of video components and metadata, the multiple interface pages of Web content being transcoded such that a layer of the layers that is substantially similar across multiple ones of the interface pages is not encoded into a respective video component for each similar occurrence of the layer, the layer and all other similar layers being represented in the interactive program with a single still of the video components and metadata wherein the metadata identifies client presentation layout characteristics of the video components, and wherein transcoding means further comprises, for a page of the pages:

(a) means for extracting text from a layer of the layers;
(b) means for encoding the text into the metadata; and
(c) means for rendering the layer as a bitmap that does not include the text.

29. A head-end server as recited in claim 28, further comprising broadcasting means for delivering the program in decode or non-decode order to the client.

30. A method as recited in claim 1, further comprising:

determining whether a particular background layer has already been rendered such that:
  in an event that the particular background layer has not already been rendered, encoding the background layer as an intra picture;
  in an event that the particular background layer has already been rendered, generating a reference to the corresponding already rendered background layer intra picture in the metadata of the current page;

determining whether a particular image layer has already been rendered such that:
  in an event that the particular image layer has not already been rendered, encoding the image layer as a predicted picture, the predicted picture being calculated from the intra picture;
  in an event that the particular image layer has already been rendered, generating a reference to the corresponding already rendered image layer in the metadata of the current page;

determining whether a particular text layer has already been rendered such that:
  in an event that the particular text layer has not already been rendered, encoding the image layer as a predicted picture, the predicted picture being calculated from the image layer;
  in an event that the particular text layer has already been rendered, generating a reference to the corresponding already rendered text layer in the metadata of the current page; and wherein the intra picture and each predicted picture are video components.

* * * * *